US 11,893,888 B2
Feb. 6, 2024

(12) United States Patent
Eskander et al.

(54) APPARATUS FOR PARKING A VEHICLE AND A PARKING MANAGEMENT SYSTEM INCLUDING THE SAME

(71) Applicants: Shady Eskander, Sydney Olympic Park (AU); Romel Ghossain, Sydney Olympic Park (AU)

(72) Inventors: Shady Eskander, Sydney Olympic Park (AU); Romel Ghossain, Sydney Olympic Park (AU)

( * ) Notice: Subject to any disclaimer, the term of this patent is extended or adjusted under 35 U.S.C. 154(b) by 0 days.

(21) Appl. No.: 18/242,296

(22) Filed: Sep. 5, 2023

(65) Prior Publication Data
US 2023/0410653 A1 Dec. 21, 2023

Related U.S. Application Data

(63) Continuation of application No. PCT/AU2023/050261, filed on Apr. 4, 2023.

(30) Foreign Application Priority Data

Apr. 6, 2022 (AU) .................. 2022202319

(51) Int. Cl.
*G08G 1/14* (2006.01)
*G08G 1/017* (2006.01)
(Continued)

(52) U.S. Cl.
CPC ............. *G08G 1/149* (2013.01); *G06Q 10/02* (2013.01); *G06V 20/54* (2022.01); *G06V 20/625* (2022.01);
(Continued)

(58) Field of Classification Search
CPC ........ G08G 1/149; G08G 1/017; G08G 1/148; G06Q 10/02; G06V 20/54; G06V 20/625; G06V 2201/08
See application file for complete search history.

(56) References Cited

U.S. PATENT DOCUMENTS

| 4,531,472 A * | 7/1985 | Marrero ............... E01F 13/048 |
| | | 116/28 R |
| 5,146,710 A * | 9/1992 | Caldwell ............... E01F 13/08 |
| | | 49/132 |

(Continued)

FOREIGN PATENT DOCUMENTS

| CN | 202380795 U | 8/2012 |
| CN | 203066574 U | 7/2013 |

(Continued)

OTHER PUBLICATIONS

International Search Report issued for International Patent Application No. PCT/AU2023/050261 dated Jun. 23, 2023.
(Continued)

*Primary Examiner* — Daryl C Pope
(74) *Attorney, Agent, or Firm* — Myers Wolin, LLC

(57) ABSTRACT

An apparatus and a parking management system for parking a vehicle is provided. The apparatus has a base member, a movable member including a support frame, support legs extending from the support frame, hinges secured to the base member and pivotably engaged with the legs, respectively, to allow the movable member to rotate relative to the base member, a driving mechanism, an information reader for reading user information, and a control unit. The control unit receives user information from the information reader and usage information from the server, and if the user information matches the usage information, sends an instruction to the actuator to cause an arm of the actuator to rotate the rotation lever, generating a force to move a support leg and drive the movable member to a position where the movable member allows the vehicle to park.

29 Claims, 18 Drawing Sheets

(51) Int. Cl.
*G06V 20/54* (2022.01)
*G06V 20/62* (2022.01)
*G06Q 10/02* (2012.01)

(52) U.S. Cl.
CPC ............ *G08G 1/017* (2013.01); *G08G 1/148* (2013.01); *G06V 2201/08* (2022.01)

(56) References Cited

U.S. PATENT DOCUMENTS

| | | | |
|---|---|---|---|
| 5,167,093 A * | 12/1992 | Hamilton | E01F 13/085 49/35 |
| 7,258,461 B1 * | 8/2007 | Izardel | E01F 13/04 362/183 |
| 10,861,335 B2 | 12/2020 | Wang et al. | |
| 2002/0043025 A1 * | 4/2002 | Zayas | E01F 9/681 49/33 |
| 2003/0029089 A1 * | 2/2003 | Wenzl | E01F 13/06 49/49 |
| 2013/0287491 A1 * | 10/2013 | Petryshyn | E01F 13/085 404/6 |
| 2015/0302742 A1 * | 10/2015 | Schuller | G08G 1/0175 340/933 |
| 2019/0205847 A1 | 7/2019 | Cho et al. | |
| 2019/0382970 A1 * | 12/2019 | Feghoul | E01F 9/692 |
| 2022/0068134 A1 | 3/2022 | Chien et al. | |

FOREIGN PATENT DOCUMENTS

| | | |
|---|---|---|
| CN | 111311926 A | 6/2020 |
| CN | 111827165 A | 10/2020 |
| CN | 108230730 B | 12/2020 |
| CN | 114775481 A | 7/2022 |
| CN | 217821736 U | 11/2022 |
| CN | 115482671 A | 12/2022 |
| EP | 3605495 A1 | 2/2020 |
| WO | 2018177225 A1 | 10/2018 |

OTHER PUBLICATIONS

Examination report No. 1 for your standard patent application issued for Australian Application No. 2022202319 dated Oct. 6, 2022.

Examination report No. 2 for your standard patent application issued for Australian Application No. 2022202319 dated Dec. 2, 2022.

Examination report No. 3 for your standard patent application issued for Australian Application No. 2022202319 dated Jan. 31, 2023.

Examination report No. 4 for your standard patent application issued for Australian Application No. 2022202319 dated Apr. 12, 2023.

* cited by examiner

200

100

500

| | 511 | 513 | 515 | 517 |
|---|---|---|---|---|
| 501 → | 0001 | NSW528 | 1:00pm-2:00pm 1 Feb 2022 | Westfield Shopping Mall, Parramatta, NSW |
| 503 → | 0002 | NSW043 | 8:00am-12:00pm 8 Feb 2022 | Basement, 15 Park Road, Sydney |
| 505 → | 0003 | NSW124 | 9:00am-10:00am 11 Feb 2022 | Public cark park, Harbor Bridge, Sydney |

```
https://www.spoto.co

Location          701   Basement, 15 Park Road, Sydney

Spot ID           703   0002

Vehicle registration number  705  NSW043

Time Period       707   8:00am-12:00pm 8 Feb 2022

709   [ Confirm ]
```

APPARATUS FOR PARKING A VEHICLE AND A PARKING MANAGEMENT SYSTEM INCLUDING THE SAME

CROSS-REFERENCE TO RELATED APPLICATION

This application is a continuation under 35 U.S.C. § 120 of International Application PCT/AU2023/050261, filed Apr. 4, 2023, which claims priority to Australian patent application No. 2022202319 filed on Apr. 6, 2022, the content of which is incorporated in its entirety herein by reference.

FIELD OF THE INVENTION

The present disclosure relates to an apparatus for parking a vehicle and a parking management system including the apparatus, particularly, relates to a smart electronic bollard or barrier for parking a vehicle and a parking management system including the same.

BACKGROUND OF THE INVENTION

A bollard or a barrier is often provided at a parking spot to enable or disable a driver to park a vehicle on the parking spot. For example, the arm of the bollard is raised to disable the driver to park the vehicle on the parking spot, while the driver can park the vehicle on the parking spot when the arm of the bollard is lowered. The traditional bollard requires the driver to manually lower and/or raise the arm of the bollard or use a remote to lower and/or raise the arm, which distracts the driver from driving and thus is not safe. On the other hand, it is not efficient for an operator of a parking lot or a car park to manage multiple (typically, hundreds of) parking spots in the parking lot or car park if each of the parking spots is provided with a traditional park bollard. Furthermore, there is no way to share these parking spaces through a software platform. Therefore, there is a need for an apparatus or an improved bollard and a parking management system for parking a vehicle to alleviate one or more of the these and other problems.

Any discussion of the background art throughout the specification should in no way be considered as an admission that such background art is prior art, nor that such background art is widely known or forms part of the common general knowledge in the field in Australia or any other country.

SUMMARY OF THE INVENTION

There is provide an apparatus for parking a vehicle on a parking spot, the apparatus comprising:
a base member,
a movable member including a support frame, a first support leg extending from the support frame, and a second support leg extending from the support frame;
a first hinge and a second hinge secured to the base member and pivotably engaged with the first support leg and the second support leg, respectively, to allow the movable member to rotate relative to the base member;
a driving mechanism, including
an electric actuator including a first arm and a second arm, wherein the first arm of the electronic actuator is pivotably attached to the base member and the second arm is retractably connected to the first arm;
a support plate secured to the base member;
a rotation lever having an actuator end and a push rod end, the rotation lever being pivotably connected to the support plate between the actuator end and the push rod end, pivotably connected to the second arm of the electric actuator at the actuator end;
a push rod pivotably connected to the push rod end of the rotation lever at a first end of the push rod and pivotably connected to the first support leg at a second end of the push rod;
an information reader configured to read user information from a user device; and
a control unit communicatively connected to the electric actuator of the driving mechanism, the information reader, and a server that stores usage information in relation to usage of the parking spot, the control unit being configured to
receive the user information from the information reader;
receive the usage information from the server; and
if the user information matches the usage information, send a first instruction to the electric actuator of the driving mechanism to cause the second arm of the electric actuator to rotate the rotation lever, generating a force to the push rod to move the first support leg in order to drive the movable member to a first position where the movable member allows the vehicle to park on the parking spot.

The user information may include a first user device identification identifying the user device used by the user, the usage information includes a second user device identification identifying the user device, the control unit is further configured to determine if the first user device identification matches the second user device identification.

The user information may include a first booking identification representing reservation of the parking spot, the usage information includes a second booking identification identifying reservation of the parking spot, the control unit is further configured to determine if the first booking identification matches the second booking identification.

The base member may include a bottom cover and a top cover, the bottom cover being configured to engage with the top cover to form an internal space, wherein the first hinge and the second hinge are secured to the bottom cover, wherein the first arm of the electronic actuator is pivotably attached to the bottom cover via a third hinge, and the support plate is secured to the bottom cover.

The support plate may include an actuator channel and a push rod channel, the rotation lever is pivotably connected to the second arm of the electric actuator via a first pin and pivotably connected to the push rod via a second pin, the first pin is configured to fit in the actuator channel and the second pin is configured to fit in the push rod channel, the actuator channel is shaped into a first curved channel and configured to guide horizontal movement of the second arm, the push rod channel is shaped into a second curved channel corresponding to the first curved channel and configured to guide horizontal movement of the push rod.

The first end of the push rod may include a first connector configured to allow the first end of the push rod to horizontally move with the push rod end of the rotation lever, and the second end of the push rod includes a second connector configured to allow the second end of the push rod to vertically move the first support leg of the movable member.

The information reader may include a Bluetooth reader, a Near Field Communication (NFC) or a Radio Frequency Identification (RFID) reader, or an Ultra Wide Band (UWB) reader.

The apparatus may further comprise:
a set of vehicle sensors communicatively connected to the control unit, the set of vehicle sensors being configured to detect a distance to the vehicle and a direction of the vehicle approaching the parking spot, and the control unit is further configured to
determine that the vehicle intends to park on the parking spot based on the distance to the vehicle and the direction of the vehicle;
receive the user information from the information reader;
receive the usage information from the server; and
if the user information matches the usage information, send the first instruction to the electric actuator of the driving mechanism to cause the second arm of the electric actuator to rotate the rotation lever, generating the force to the push rod to move first support leg in order to drive the movable member to the first position where the movable member allows the vehicle to park on the parking spot.

The apparatus may further comprise a camera attached to the base member, the camera being configured to capture an image of the vehicle, and send the image of vehicle to the control unit, the control unit being configured to recognise the identification number of the vehicle.

The apparatus may further comprise a display attached to the movable member and communicatively connected to the control unit, the control unit is further configured to present the identification number on the display.

The apparatus may further comprise a speaker attached to the movable member and communicatively connected to the control unit, and the control unit is further configured to cause the speaker to generate an audible sound signal.

The apparatus may further comprise:
a battery to provide electrical power;
a battery sensor communicatively connected to the battery and the control unit, the battery sensor being configured to detect a battery level of the battery, and the control unit is further configured to
receive a battery indication from the battery sensor indicative of the battery level of the battery; and
send a battery level alert to the server if the battery level of the battery is below a battery level threshold.

The apparatus may further comprise a first communication unit communicatively connected to the control unit, and the control unit is further configured to communicate with the server via the first communication unit.

The first communication unit may operate under a communication protocol including LoRaWan, WiFi and Bluetooth.

The apparatus may further comprise:
a second communication unit communicatively connected to the control unit, the second communication unit being configured to receive media and advertising information from a media and advertising server, and the control unit is further configured to
receive the media and advertising information from the second communication unit; and
present the media and advertising information on the display.

The apparatus may further comprise:
a vibration sensor communicatively connected to the control unit, the vibration sensor being configured to detect a vibration level, and the control unit is further configured to
receive a vibration indication from the vibration sensor indicative of the vibration level; and
send a vibration alert to the server and cause the speaker to generate the audible sound signal if the vibration level is above a vibration threshold, or
enable the camera to take one or more images or video footages with a time stamp in order to produce a visual record if the vibration level is above a vibration threshold.

The apparatus may further comprise:
a moisture sensor communicatively connected to the control unit, the moisture sensor being configured to detect a moisture level, and the control unit is further configured to
receive a moisture indication from the moisture sensor indicative of the moisture level; and
send a moisture alert to the server if the moisture level is above a moisture threshold, or
enable the camera to take one or more images or video footages with a time stamp in order to produce a visual record if the moisture level is above a moisture threshold.

The apparatus may further comprise:
a motion sensor communicatively connected to the control unit, the motion sensor being configured to detect a motion event caused by a surrounding object, and the control unit is further configured to
receive a motion indication from the motion sensor indicative of the motion event; and
cause the speaker to generate an audible sound alert.

The apparatus may further comprise:
a temperature sensor communicatively connected to the control unit, the temperature sensor being configured to detect a temperature level, and the control unit is further configured to
receive a temperature indication from the temperature sensor indicative of the temperature level; and
send a temperature alert to the server if the temperature level is above a temperature threshold, or
enable the camera to take one or more images or video footages with a time stamp in order to produce a visual record if the temperature level is above a temperature threshold.

The apparatus may further comprise:
a power supply that provides electricity from an electricity grid; and
an electricity measuring device communicatively connected to the control unit and the power supply, the electricity measuring device being configured to measure electricity consumption of the power supply,
the control unit is further configured to
receive electricity consumption data from the electricity measuring device indicative of the electricity consumption of the power supply; and
send the electricity consumption data to the server.

The usage information may include a time period in which the parking spot can be used, and the control unit is further configured to
determine a current time; and
send the first instruction to the driving mechanism to drive the movable member to the first position if the current time is within the time period.

The support frame may be substantially coplanar with the base member when the support frame is in the first position.

The support frame may be substantially vertical to the base member when the support frame is in the second position.

The support frame may further comprise a first side bar, a second side bar, a top panel and a bottom panel, wherein the first side bar and the second side bar are attached to the top panel and the bottom panel, the first support leg and the second support leg extending from the bottom panel.

The display may be embedded between the first side bar, the second side bar, the top panel and the bottom panel.

The apparatus may further comprise a solar panel embedded between the side bar, the second side bar, the top panel and the bottom panel.

The apparatus may further comprise:
a first car-above sensor communicatively connected to the control unit, the first car-above sensor being positioned on the base member and configured to detect presence of the vehicle over the base member;
a second car-above sensor communicatively connected to the control unit, the second car-above sensor being positioned on the top panel of the support frame and configured to detect presence of the vehicle over the moveable member,
the control unit is further configured to
 receive a first car-above indication from the first car-above sensor indicating that the vehicle is not above the base member, and a second car-above indication from the second car-above sensor indicating that the vehicle is not above the moveable member; and
 send a second instruction to the driving mechanism to drive the movable member to a second position where the movable member does not allow the vehicle to park on the parking spot.

The apparatus may further comprise a set of collision sensors communicatively connected to the control unit, the set of collision sensors positioned on the top panel of the support frame and being configured to detect a potential collision between the moveable member and an object during movement of the moveable member, and send a collision signal to the control unit, and the control unit is configured to stop movement of the moveable member in order to avoid a collision between the moveable member and the object.

There is provided an apparatus for parking a vehicle on a parking spot. The apparatus may comprise:
a base member;
a movable member movably attached to the base member;
a driving mechanism attached to the base member and the movable member, the driving mechanism being configured to drive the movable member;
a camera attached to the base member, the camera being configured to capture an image of the vehicle; and
a control unit communicatively connected to the driving mechanism, the camera, and a server that stores usage information in relation to usage of the parking spot, the control unit being configured to
 receive the image of the vehicle from the camera;
 determine a first identification number of the vehicle from the image of the vehicle;
 receive the usage information from the server, the usage information including a second identification number; and
 if the first identification number matches the second identification number, send a first instruction to the driving mechanism to drive the movable member to a first position where the movable member allows the vehicle to park on the parking spot.

There is provided a parking management system for parking a vehicle on a parking spot. The parking management system may comprise:
a group of apparatuses as described above;
a server communicatively connected to each of the apparatuses via a communication network, wherein the server is configured to
 receive usage information in relation to usage of the parking spot from a computing device used by a user, the usage information including an identification number identifying the vehicle;
 receive a request for the usage information from one of the group of apparatuses via the network; and
 send the usage information including the identification number to the apparatus via the communication network.

The communication network may operate under a communication protocol including LoRaWan and WiFi.

The server may be further configured to
receive one or more of following alerts from one of the group of apparatuses,
 a battery level alert,
 a vibration alert,
 a moisture alert,
 a temperature alert; and
send an electronic message to a device associated with an operator for service purposes.

The server may be further configured to
receive electricity consumption data from the apparatus indicative of electricity consumption of the apparatus; and
store the electricity consumption data in association with an apparatus identifier that identifies the apparatus.

The parking management system may further comprise:
a positioning device associated with the vehicle, the positioning device comprising an inertial navigation system to determine a position of the vehicle, the positioning device being configured to send the position of the vehicle to the server via a communication network operating under a communication protocol including LoRaWan.

Other aspects of the invention are also disclosed in the present disclosure.

BRIEF DESCRIPTION OF THE DRAWINGS

Notwithstanding any other forms which may fall within the scope of the present disclosure, embodiments of the invention will now be described, by way of example only, with reference to the accompanying drawings in which:

FIG. 5 illustrates an exemplary table for storing the usage information in accordance with an embodiment of the present disclosure;

FIG. 7 illustrates an exemplary web portal for parking a vehicle in accordance with an embodiment of the present disclosure.

Figure 1:
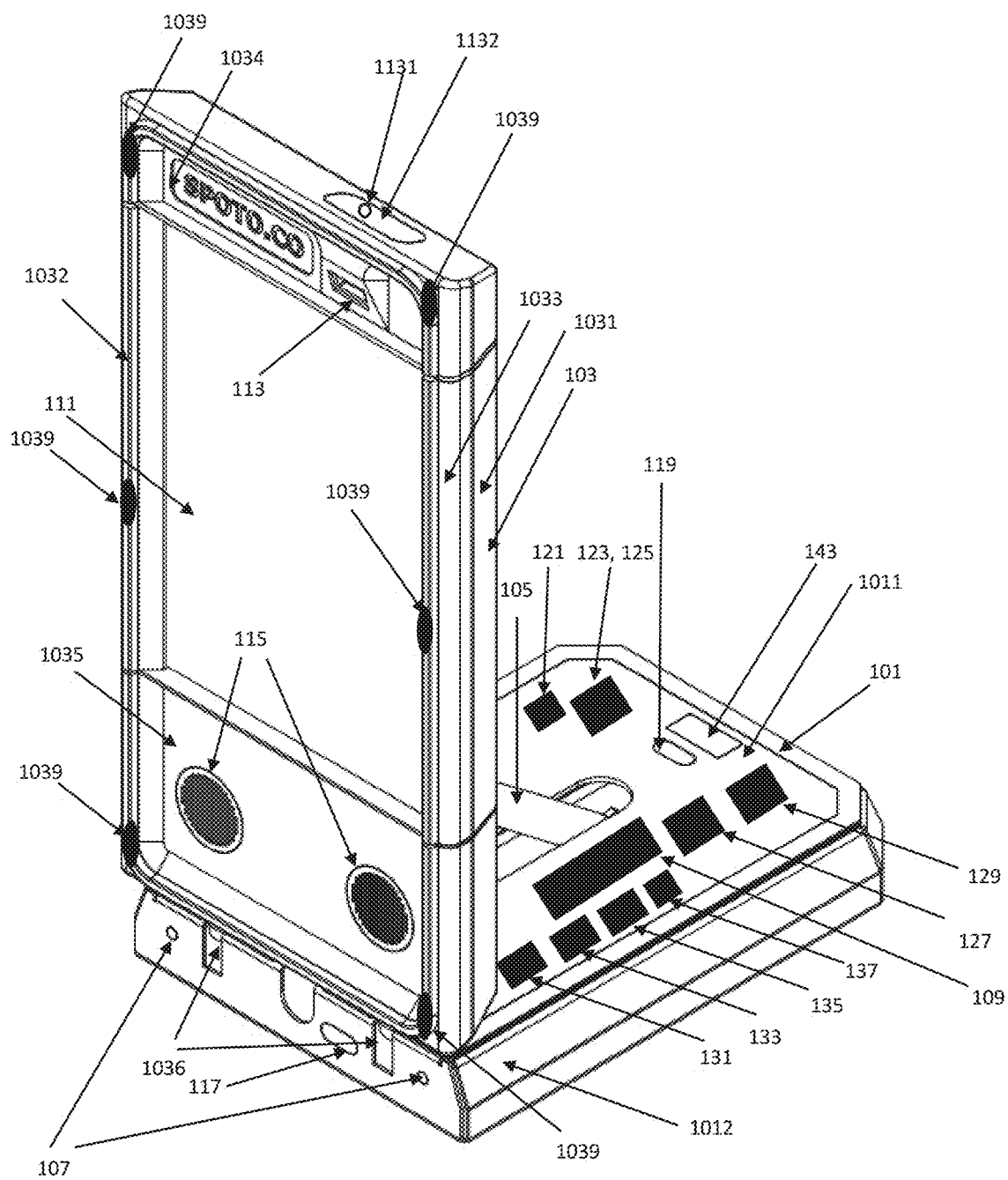
FIG. 1 illustrates an apparatus for parking a vehicle on a parking spot in accordance with an embodiment of the present disclosure.

It should be noted in the accompanying drawings and description below that like or the same reference numerals in different drawings denote the same or similar elements. Also, the dimension lines and associated dimensions in the accompanying drawings are for illustration purposes only, and these elements should not be interpreted as limitations to the present disclosure.

DESCRIPTION OF EMBODIMENTS

Figure 2:
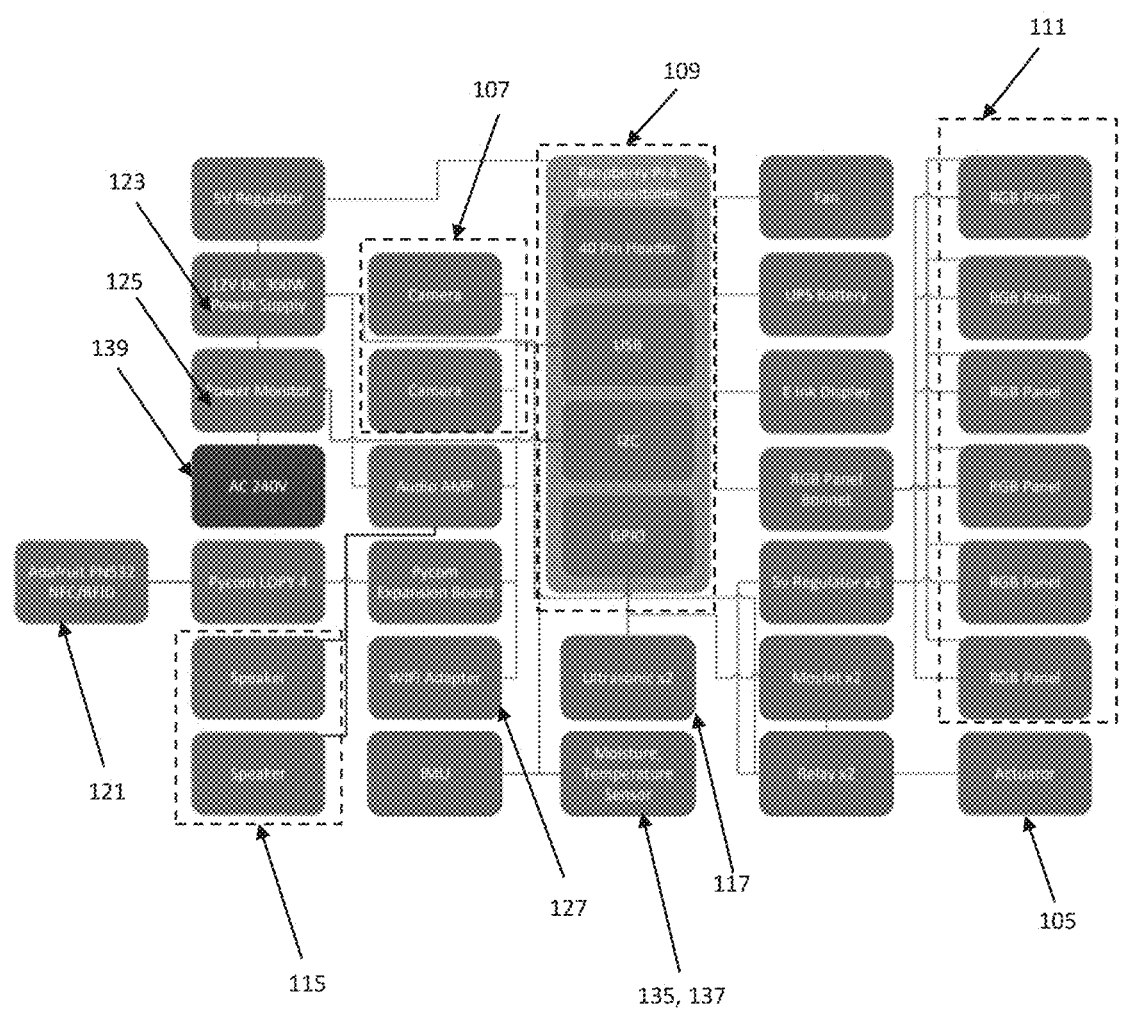
FIG. 2 is a system diagram of the apparatus in accordance with the embodiment of the present disclosure.
Figure 3:
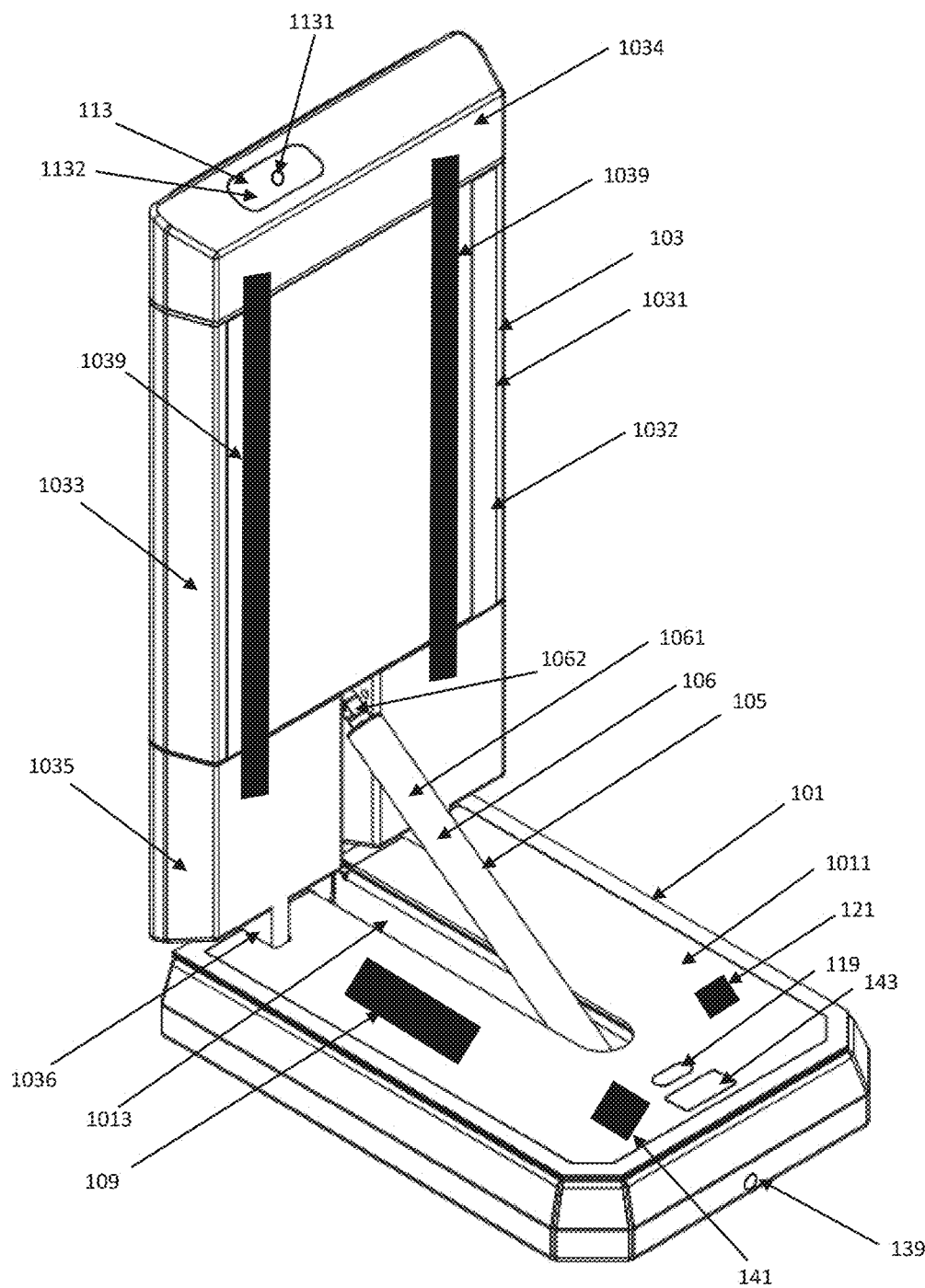
FIG. 3 illustrates a rear view of the apparatus in accordance with the embodiment of the present disclosure.

FIG. 1 illustrates an apparatus 100 for parking a vehicle on a parking spot in accordance with an embodiment of the present disclosure. The apparatus 100 can also be referred to as a bollard or barrier in the present disclosure. FIG. 2 is a system diagram 200 of the apparatus 100 in accordance with the embodiment of the present disclosure. FIG. 3 illustrates a rear view of the apparatus 100 in accordance with the embodiment of the present disclosure.

As shown in FIGS. 1 and 2, the apparatus 100 comprises a base member 101, a movable member 103 movably attached to the base member 101, a driving mechanism 105 attached to the base member 101 and the movable member 103. The driving mechanism (or actuator in FIG. 2) 105 is configured to drive the movable member 103 to a first position and a second position relative to the base member 101. In normal use, the apparatus 100 is placed in a way that the base member 101 contacts the ground. The moveable 103 can be driven by the driving member 105 between the first position and the second position. The moveable member 101 is in the second position where the apparatus 100 does not allow a vehicle to park on the parking spot.

The apparatus 100 further comprises one or more cameras 107 attached to the base member 101. The camera 107 is configured to capture an image of the vehicle (shown in FIG. 6) that is approaching the parking spot. The image of the vehicle includes an image of the number plate of the vehicle. The apparatus 100 further comprises a control unit 109 communicatively connected to the driving mechanism 105, the camera 107, and a server (shown in FIG. 6) that stores usage information in relation to usage of the parking spot. For example, the server can store the usage information of the parking spot in association with a serial number (or identification number) of the apparatus 100 as a data record in a database. The database can be part of the server. The database can also be a remote database without departing from the scope of the present disclosure.

Figure 4:
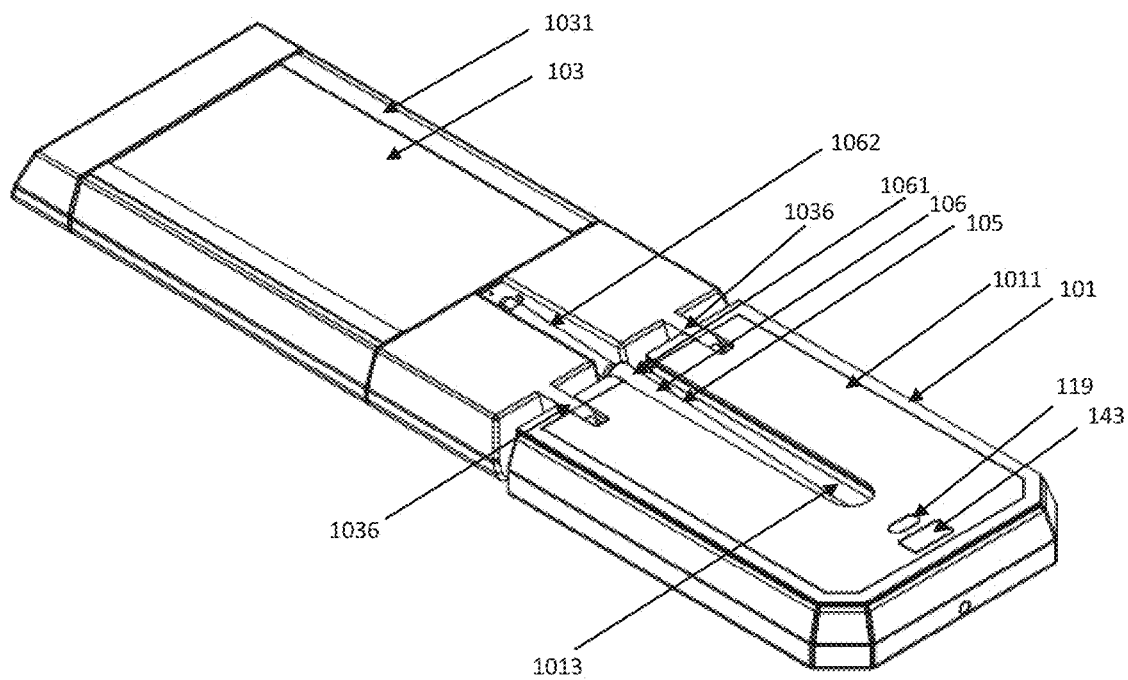
FIG. 4 illustrates the apparatus in accordance with the embodiment of the present disclosure where the moveable member is in a first position.

The control unit (or microcontroller in FIG. 2) 109 is configured to receive the image of the vehicle from the camera 107. The control unit 109 is also configured to determine a first identification number of the vehicle from the image of the vehicle. The first identification number of the vehicle can be for example the vehicle registration number or plate number displayed on the number plate of the vehicle. The control unit 109 can determine the vehicle registration number of the vehicle from the image of the vehicle via an optical character recognition (OCR) algorithm. The control unit 109 further receives the usage information of the parking spot from the server based on the identification number or serial number of the apparatus 100. The usage information includes a second identification number, for example, a vehicle registration number of a vehicle that is allowed to use the parking spot. If the first identification number matches the second identification number, for example, the vehicle registration number recognised from the image of the vehicle is identical to the vehicle registration number received from the server, that means the vehicle that is approaching the parking spot is the vehicle that is allowed to use the parking spot. The control unit 109 then sends a first instruction to the driving mechanism 105 to drive the movable member 103 to a first position where the movable member 103 allows the vehicle to park on the parking spot. FIG. 4 illustrates the apparatus 100 in accordance with the embodiment of the present disclosure where the moveable member 103 is in the first position. As shown in FIG. 4, the moveable member 103 is driven by the driving mechanism 105 to be substantially coplanar with the base member 101. In other words, both the base member 101 and the moveable member 103 contact the ground. This way, the apparatus 100 allows the approaching vehicle to park on the parking spot.

In an example, the apparatus 100 further includes a display 111 attached to the movable member 103 and communicatively connected to the control unit 109. The display 111 can comprise one or more display panels, for example, RGB panels, as shown in FIG. 2. The one or more display panels can be covered by a transparent protection film. The transparent protection film can be made of transparent thermoplastic. The control unit 109 is further configured to present the first identification number on the display 111. This way, the vehicle registration number of the approaching vehicle can be displayed on the display 111. In another example, the control unit 109 is further configured to present images, video or other forms of media on the display 111 without departing from the scope of the present disclosure.

In an example, the apparatus 100 further includes a projector 113 attached to the movable member 103 to project an optical pattern. The optical pattern can be a pattern for advertisement purposes.

In an example, the apparatus 100 further includes one or more speaker 115 attached to the movable member 103 and communicatively connected to the control unit 109. The control unit 109 is further configured to cause the speaker 115 to generate an audible sound signal. The audible sound signal can be a sound to prompt the user (or the driver) to park or leave on the parking spot. The audible sound signal can also be a sound that matches the images or video presented on the display 111.

In an example, the apparatus 100 further includes a distance sensor (or the ultrasound sensor in FIG. 2) 117 communicatively connected to the control unit 109. The distance sensor 117 detects the vehicle approaching the parking spot. If the distance sensor 117 detects the approaching vehicle, the distance sensor 117 sends a vehicle proximity indication to the control unit 109. The control unit 109 is further configured to receive the vehicle proximity indication from the distance sensor 117 indicating that the vehicle is approaching the parking spot. The control unit 109 enables the camera 107 to capture the image of the vehicle (for example, the image of the number plate of the vehicle) and receives the image of the vehicle from the camera 107. The control unit 109 recognises the first identification number of vehicle from the image of the vehicle, for example, the vehicle registration number or plate number displayed on the number plate of the vehicle. The control unit 109 further extracts the second identification number from the usage information of the parking spot. If the first identification number matches the second identification number, the control unit 109 sends the first instruction to the driving mechanism 105 to drive the movable member 103 to the first position in response to the vehicle proximity indication. This way, the apparatus 100 allows the vehicle to park on the parking spot.

In an example, the apparatus 100 further includes a car-above sensor 119 communicatively connected to the control unit 109. The car-above sensor 119 can be a proximity sensor. The car-above sensor 119 detects presence of the vehicle over the base member 101 or the movable member 103. As described above, when the vehicle parks on the parking spot, the moveable member 103 is in the first position where it is substantially coplanar with the base member 101 to allow the vehicle to park on the parking spot. After the vehicle leaves the parking spot, the control unit 109 receives a car-above indication from the car-above sensor 119 indicating that the vehicle is not above the base member 101 or the moveable member 103. The control unit 109 sends a second instruction to the driving mechanism 105 to drive the movable member 103 to a second position where the movable member 103 does not allow the vehicle or other vehicles to park on the parking spot. For example, the driving mechanism 105 drives the moveable member 103 to an upright position, as shown in FIGS. 1 and 3. The moveable member 103 in the upright position prevents a vehicle from parking on the parking spot.

In an example, the apparatus 100 includes an information reader 121, for example, an NFC (Near Field Communication) reader or a Radio Frequency Identification (RFID) reader or a Bluetooth reader, or an Ultra Wide Band (UWB) reader, communicatively connected to the control unit 100. The information 121 can be placed in the apparatus 100 or attached to the apparatus 100 for access by the user (or driver) when the user is close to the apparatus 100.

In another example, the information reader 121 can also be separated from other parts of the apparatus 100. The information reader 121 can be installed at a certain distance from the apparatus 100. For example, the information reader 121 can be installed on the boom gate at the entry of the parking lot. Other communication protocols, for example, Bluetooth, Sigfox, NB-IoT, or UWB, can also be used where applicable.

The information reader 121 reads the first identification number of the vehicle (for example, the vehicle registration number of the vehicle) from a user device (not shown). The user device can be an NFC/RFID, Bluetooth, UWB tag that stores the first identification number of the vehicle. The user device can also be another device that incorporates an NFC/RFID or Bluetooth or UWB tag. For example, the user device can be the smart phone of the user (or driver) that supports NFC/RFID, Bluetooth, UWB functionalities without departing from the scope of the present disclosure. The user device can also be an external card or a chip that supports NFC/RFID, Bluetooth, UWB functionalities without departing from the scope of the present disclosure. The user (or driver) taps the information reader 121 with the NFC/RFID or Bluetooth or UWB tag, the external card/chip, or the smart phone, the information reader 121 then reads the first identification number of the vehicle from the NFC/RFID or Bluetooth or UWB tag, the external card/chip, or the smart phone and sends the first identification number of vehicle to the control unit 109. The control unit 109 receives the first identification number of the vehicle from the information reader 121 and receives the usage information of the parking spot. The control unit 109 further extracts the second identification number from the usage information of the parking spot. If the first identification number matches the second identification number, the control unit 109 sends the first instruction to the driving mechanism 105 to drive the movable member 103 to the first position.

In an example, the apparatus 100 includes a battery 123 to provide electrical power. The battery 123 typically provides a DC power supply, as shown in FIG. 2. The apparatus 100 further includes a battery sensor (or power monitor in FIG. 2) 125 communicatively connected to the battery 123 and the control unit 109. The battery sensor 125 detects a battery level of the battery 123 and sends a battery indication indicative of the battery level of the battery 123 to the control unit 109. The control unit 109 receives the battery indication from the battery sensor 125. If the battery level of the battery 123 is below a battery level threshold, the control unit 109 sends a battery level alert to the server. In response to the battery level alert, the server can send a message (for example, an email or a SMS short message) to a technician for service or maintenance purposes.

In an example, the apparatus 100 includes a first communication unit 127 communicatively connected to the control unit 109. The control unit 109 is further configured to communicate with the server via the first communication unit 127. For example, the control unit 109 can receive the usage information of the parking spot and send the battery level alert to the server via the first communication unit 127. The first communication unit 127 can operate under various communication protocols including but not limited to WiFi, LoRaWan, Bluetooth and cellular communication network protocols (for example, 3G, 4G, 5G, or 6G), and combinations of the various communication protocols without departing from the scope of the present disclosure.

In an example, the apparatus 100 further includes a second communication unit 129 communicatively connected to the control unit 109. The second communication unit 129 is configured to receive media and advertising information from a media and advertising server (not shown). The control unit 109 is further configured to receive the media and advertising information from the second communication unit 129 and present the media and advertising information on the display 111. As the media and advertising information generally requires more bandwidth for efficient transmission, the second communication unit 129 can operate under the WiFi or cellular communication protocols, or the combinations thereof.

In an example, the apparatus 100 further includes a vibration sensor 131 communicatively connected to the control unit 109. The vibration sensor 131 is configured to detect a vibration level of the apparatus 100 when the apparatus 100 is impacted by an object and send a vibration indication indicative of the vibration level to the control unit 109. The control unit 109 receives the vibration indication from the vibration sensor 131 and sends a vibration alert to the server. The control unit 109 causes the speaker 115 to generate the audible sound signal if the vibration level is above a vibration threshold. The control unit 109 can also enable the camera 107 to take one or more images or video footages with a time stamp in order to produce a visual record if the vibration level is above the vibration threshold or when the impact happens. In response to the vibration alert, the server can send a message (for example, an email or a SMS short message) to a technician for service or maintenance purposes.

In an example, the apparatus 100 further includes a moisture sensor 133 communicatively connected to the control unit 109. The moisture sensor 133 is preferably located in the apparatus 100 detects a moisture level in the apparatus 100. The moisture sensor 133 sends a moisture indication to the control unit 109 indicative of the moisture level. The control unit 109 receives the moisture indication from the moisture sensor 133 and sends a moisture alert to the server if the moisture level is above a moisture threshold. In response to the moisture alert, the server can send a message (for example, an email or a SMS short message) to a technician for service or maintenance purposes. The control unit 109 can also be configured to enable the camera 107 to take one or more images or video footages with a time stamp in order to produce a visual record if the moisture level is above a moisture threshold.

In an example, the apparatus 100 further includes a motion sensor 135 communicatively connected to the control unit 109. The motion sensor 135 detects a motion event caused by a surrounding object and sends a motion indication to the control unit 109 indicative of the motion event. The control unit 109 receives the motion indication from the motion sensor 135 and causes the speaker 115 to generate an audible sound alert. For example, if a child runs around the apparatus 100, the motion sensor 135 detects the motion of the child and the speaker 115 generates the audible sound alert, which might avoid the child being hurt and the apparatus 100 being damaged. The control unit 109 can also enable the camera 107 to take one or more images or video footages with a time stamp in order to produce a visual record when the motion event happens.

In an example, the apparatus 100 further includes a temperature sensor 137 communicatively connected to the control unit 109. The temperature sensor 137 detects a temperature level around or in the apparatus 100 and sends a temperature indication to the server indicative of the temperature level. The control unit 109 receives the temperature indication from the temperature sensor and sends a temperature alert to the server if the temperature level is above a temperature threshold. In response to the temperature alert, the server can send a message (for example, an email or a SMS short message) to a technician for service or maintenance purposes. The control unit 109 can also be configured to enable the camera 107 to take one or more images or video footages with a time stamp in order to produce a visual record if the temperature level is above a temperature threshold.

In an example, the apparatus 100 further includes a power supply 139 (shown in FIG. 3) that provides electricity from an electricity grid. The power supply 139 is typically an AC power supply. The apparatus 100 further includes an electricity measuring device 141 (shown in FIG. 3) communicatively connected to the control unit 109 and the power supply 139. The electricity measuring device 141 is configured to measure electricity consumption of the power supply 141 and send electricity consumption data to the control unit 109 indicative of the electricity consumption. The control unit 109 receives the electricity consumption data from the electricity measuring device 141 and sends the electricity consumption data to the server, which in turn records the electricity consumption of the apparatus 100 for various purposes, for example, billing.

In an example, the usage information of the parking spot includes a time period in which the parking spot can be used. The control unit 109 is further configured to determine a current time and send the first instruction to the driving mechanism 105 to drive the movable member 103 to the first position if the current time is within the time period.

In an example, the apparatus 100 further includes an E-ink display 143 communicatively connected to the control unit 109 to display an apparatus identification number or serial number of the apparatus 100 for easy access to the apparatus identification number or serial number of the apparatus 100.

FIG. 5 illustrates an exemplary table 500 for storing the usage information in accordance with an embodiment of the present disclosure. The table 500 includes a group of data records 501, 503, 504 (three data records exemplarily shown in table 500) and can be stored in a database (shown in FIG. 6). Each of the data records includes one or more fields (four fields exemplarily shown in table 500), apparatus identification number (serial number) 511, vehicle identification number 513, time period 515, and apparatus location 517. Taking data record 501 as an example, the apparatus 100 deployed at the parking spot is identified as 0001, field 511. The parking spot is reserved for the vehicle identified by the vehicle identification number NSW528, field 513 (for example, the vehicle registration number displayed on the number plate of the vehicle). The vehicle is allowed to use the parking spot from 1:00 pm to 2:00 pm 1 Feb. 2022, filed 515. The parking spot is located in the Westfield shopping center in Paramatta, New South Wales (NSW), field 517.

In the example shown in FIGS. 1, 3 and 4, the base member 101 of the apparatus 100 includes an elongate base plate 1011. The movable member 103 of the apparatus 100 includes an elongate frame 1031 pivotably attached to the elongate base plate 1011. The driving mechanism 105 includes an electronic actuator 106 having a first arm 1061 and a second arm 1062 (shown in FIGS. 3 and 4). The first arm 1061 of the electronic actuator 106 is pivotably attached to the elongate base plate 1011 and the second arm 1062 is retractably positioned in the first arm 1061 and attached to the elongate frame 1031 so as to drive the elongate frame 1031 to the first position or the second position.

As shown is FIG. 4, when the second arm 1062 extends out of the first arm 1061, the elongate frame 1031 is driven by the second arm 1062 to the first position where the second arm 1062 is substantially coplanar with the elongate base plate 1011. That is, both the first arm 1061 and the second arm 1062 contact the ground. As a result, the apparatus 100 allows the vehicle to park on the parking spot.

As shown in FIGS. 1 and 3, when the second arm 1062 is retracted into the first arm 1061, the elongate frame 1031 is driven by the second arm 1062 to the second position where the second arm 1062 is substantially vertical to the elongate base plate 1011. Therefore, the apparatus 100 prevents the vehicle from parking on the parking spot.

The elongate frame 1031 further comprises a first side bar 1032, a second side bar 1033, a top panel 1034 and a bottom panel 1035, as shown in FIG. 1. The first side bar 1032 and the second side bar 1033 are attached to the top panel 1034 and the bottom panel 1035. Further, the first side bar 1032 and the second side bar 1033 are pivotably attached to the elongate base plate 1011 through at least one hinge 1036, such that the elongate frame 1031 can be driven by the second arm 1062 of the electric actuator 106 to the first position and the second position. In an example, the elongate frame 1031 further comprises one or more protection pads 1038 extending from the first side bar 1032 or the second side bar 1033. The one or more protection pads 1038 are configured to contact the ground to protect the elongate frame 1031 from being damaged when the moveable member 103 is driven to the first position where it is substantially coplanar with the base member 101, as shown in FIG. 4. The one or more protection pads 1038 can be made of flexible materials, including but not limited to rubber, plastic, etc. In an example, the elongate frame 1031 further comprises one or more protection strips 1039 extending on the back of the elongate frame 1031. As shown in FIG. 3, the one or more protection strips 1039 extend over the bottom panel 1035, the first side bar 1032 or the second side bar 1033, and the top panel 1034. The one or more protection strips 1039 are also configured to protect the elongate frame 1031 from being damaged when the moveable member 103 is driven to the first position. The one or more protection strips 1039 can be made of flexible materials, including but not limited to rubber, plastic, etc.

As shown in FIG. 1, the display 111 is embedded between the first side bar 1032, the second side bar 1033, the top panel 1034 and the bottom panel 1035. The projector 113 is attached to the top panel 1034. The projector 113 includes a light 1131 and a slides holder 1132 to hold a slide or a film insert including an optical pattern formed thereon. The projector 113 is orientated towards the ground, such that the optical pattern formed on the slide or the film insert can be projected by the light 1131 of the projector 113 onto the ground. The slide or film insert can be replaced with another slide or film insert to project the desired pattern onto the ground.

In an example, the distance sensor 117 is attached to the elongate base plate 1011 and the speaker 115 is attached to the bottom panel 1035.

In an example, the elongate base plate 1011 includes a component compartment 1012 to accommodate one or more of the control unit 109, the distance sensor 117, the car-above sensor 119, the information reader 121, the battery 123, the battery sensor 125, the first communication unit 127, the second communication unit 129, the vibration sensor 131, the moisture sensor 133, the motion sensor 135, and the temperature sensor 137.

In an example, the camera 107 is attached to the component compartment 1012.

In an example, the component compartment 1012 includes a recessed portion 1013 (shown in FIGS. 3, 4) configured to accommodate the electronic actuator 106 when the elongate frame 1031 is in the first position.

Figure 6:
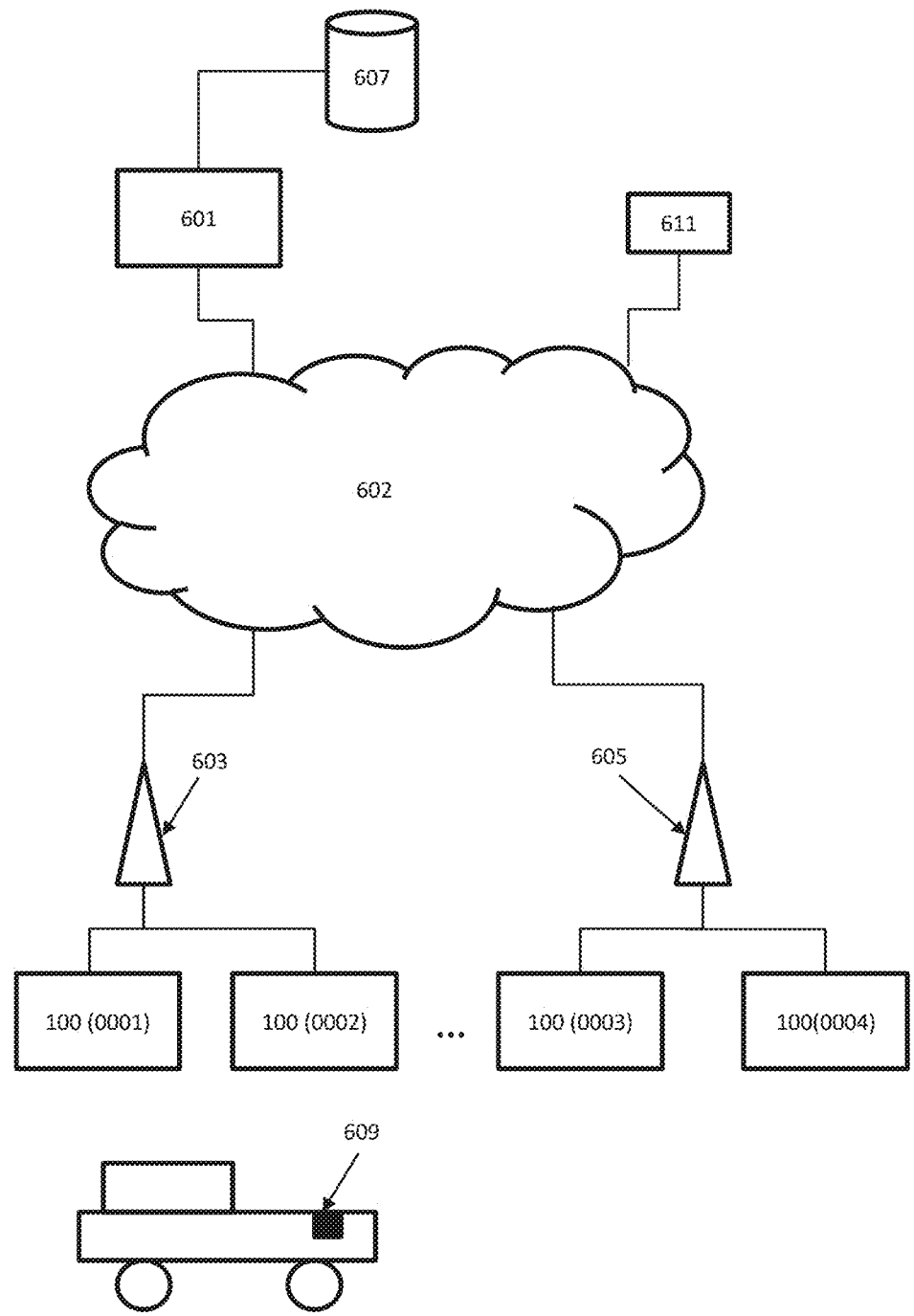
FIG. 6 illustrates an exemplary parking management system for parking a vehicle on a parking spot in accordance with an embodiment of the present disclosure.

FIG. 6 illustrates an exemplary parking management system 600 for parking a vehicle on a parking spot in accordance with an embodiment of the present disclosure. It should be noted that although the parking management system 600 is described with reference to the apparatus 100, other apparatuses 800, 900, 1000 described in the present disclosure can also be used without departing from the scope of the present disclosure. The parking management system 600 includes a group of apparatuses 100 identified as 0001, 0002, 0003, 0004, as described above. The parking management system 600 also includes a server 601. The server 601 is communicatively connected to each of the apparatuses 100 via a communication network 602. The communication network 602 includes various communication networks without departing from the scope of the present disclosure, including Internet, wireless local area networks (for example, WiFi), wide area networks (for example, LoRaWan), optical networks, cellular communication network (for example, 3G, 4G, 5G, or 6G), and their combinations. The parking management system 600 further includes one or more network gateways 603, 605. Each of the network gateways 603, 605 is communicatively connected to one or more of the apparatuses 100. As shown in FIG. 6, the network gateway 603 is connected to the apparatuses 100 identified as 0001, 0002, and the network gateway 605 is connected to the apparatuses 100 identified as 0003, 0004. The gateways 603, 605 also operate under various communication protocols that are compatible with or can work with the communication network 602.

Depending on the application environment in which the apparatuses 100 are deployed, the communication network 602 and the gateways 603, 605 may adopt different communication protocols without departing from the scope of the present disclosure. For example, if the apparatuses 100 are deployed in a basement parking lot (for example, as shown in the data record 503) where the wireless channel quality is usually not good enough for cellular communication network protocols, the communication network 602 and the gateways 603, 605 can operate under the LoRaWan communication protocol combined with Internet communication protocols to provide quality communication between the server 601 and the apparatuses 100. As another example, if the apparatuses 100 are deployed in an open parking lot in city area (for example, as shown in the data record 505) where the wireless channel quality is usually good enough for cellular communication network protocols or wireless local area network protocols, the communication network 602 and the gateways 603, 605 can operate under the cellular communication network protocols or wireless local area network protocols combined with Internet communication protocols to provide quality communication between the server 601 and the apparatuses 100. Other communication protocols, for example, Bluetooth, Sigfox, NB-IoT, UWB, can also be used where applicable.

In an example, before a user (or a driver) uses a parking spot, the user (or driver) needs to book one of the parking spots in a parking lot. The user can book a parking spot through a web portal. FIG. 7 illustrates an exemplary web portal 700 for parking a vehicle in accordance with an embodiment of the present disclosure. The user (or driver) can access the web portal 700 via a computing device 611. The computing device 611 can be a smart phone, a desktop computer, a laptop computer, a tablet computer, etc., without departing from the scope of the present disclosure. The user uses the computing device 611 to provide the usage information in relation to use of a parking spot.

In this example, the user intends to park in a parking lot located at the basement, 15 Park Road, Sydney, 701. The user can choose a parking spot in the parking lot for easy access purposes. The use can also be automatically assigned a parking spot by the parking management system 600 without departing from the scope of the present disclosure. The parking spot chosen by the user or assigned by the parking management system 600 is identified as 0002, 703. For easy description in the present disclosure, the spot ID is identical to the apparatus identification number identifying the apparatus 100 that is deployed at the parking spot 0002. However, the spot ID can be mapped to an apparatus identification number in a different way without departing from the scope of the present disclosure. The user provides the second identification number of the vehicle, for example, the vehicle registration number displayed on the number plate of the vehicle, NSW043 in this example, 705. The user can also specify the time period during which the user will be using the parking spot, 8:00 am-12:00 pm 8 Feb. 2022 in this example, 707. The computing device 611 sends the usage information to the server 601 if the user (or driver) confirms the booking by clicking on the "confirm" button 709 on the web portal 700.

The server 601 receives the usage information in relation to the usage of the parking spot 0002 from the computing device 611 used by the user. As described above, the usage information includes at least the second identification number identifying the vehicle. In this example, the server 601 stores the usage information as the data record 503 in the table 500, as shown in FIG. 5. The parking management system 600 can further include a database 607 connected to the server 601 to store the table 500. The database 607 can also be an integrated part of the server 601 without departing from the scope of the present disclosure.

The parking management system 600 further includes a positioning device 609 associated with the vehicle. The positioning device 609 includes an inertial navigation system to determine a position of the vehicle. The positioning device 609 is configured to send the position of the vehicle to the server 601 via the communication network 602 operating under a communication protocol including LoRaWan and WiFi.

The user arrives at the parking lot and looks for the parking spot 0002 in the parking spot. Meanwhile, the server 601 receives the position of vehicle from the positioning device 609 and marks vehicle's position on a digital map showing the location of the parking spot 0002. The server 601 sends the marked digital map to a user terminal used by the user. The user terminal can be the same user terminal that user used to book the parking spot. The user terminal can also be a different user terminal carried by the user or installed in the vehicle without departing the scope of the present disclosure. This way, the user determines the precise location of the parking spot 0002 in the parking lot and drives the vehicle to the parking spot 0002. When vehicle is close to the apparatus 100 (identified as 0002) deployed at the parking spot 0002, the apparatus 100 is activated to determine if the vehicle is allowed to park. Specifically, the distance sensor 117 of the apparatus 100 detects the approaching vehicle and sends a vehicle proximity indication to the control unit 109. The control unit 109 receives the vehicle proximity indication from the distance sensor 117 indicating that the vehicle is approaching the parking spot 0002. The control unit 109 then enables the camera 107 to capture an image of the vehicle and receives the image of the vehicle from the camera 107. The control unit 109 recognises the first identification number of vehicle from the image of the vehicle, for example, the vehicle registration number displayed on the number plate of the vehicle. The control unit 109 sends a request to the server 601 for the usage information in relation to the apparatus 100 identified as 0002. Upon receipt of the request at the server 601, the server 601 retrieves the usage information as requested from the table 500 in the database 607, which is the data record 503 in this example. The server 601 then sends the usage information to the control unit 109 of the apparatus 100 identified as 0002 via the communication network 602. The control units 109 receives the usage information from the server 601 via the communication network 602 and the corresponding network gateway 603. The control unit 109 further extracts the second identification number from the usage information of the parking spot 0002. If the first identification number recognised from the image of the vehicle matches the second identification number extracted from the usage information, the control unit 109 sends the first instruction to the driving mechanism 105 to drive the movable member 103 to the first position. This way, the apparatus 100 identified as 0002 allows the vehicle to park on the parking spot 0002 in the parking lot.

In an example, the control unit 109 determines a current time and extracts the time period from the usage information. If the current time is within the time period extracted from the usage information, the control unit 109 sends the first instruction to the driving mechanism 105 to drive the movable member 103 to the first position.

In an example, if the parking spot 0002 has been occupied by another vehicle, the server 601 can assign a different parking spot in the parking lot to the user (or driver).

After the vehicle leaves the parking spot 0002, the control unit 109 receives a car-above indication from the car-above sensor 119 indicating that the vehicle is not above the base member 101 or the moveable member 103. The control unit 109 sends the second instruction to the driving mechanism 105 to drive the movable member 103 to the second position where the movable member 103 does not allow the vehicle or other vehicles to park on the parking spot 0002. The control unit 109 can also send a message to the server 601 indicating that the vehicle has left the parking spot 0002. The server 601 receives the message from the control unit 109 and removes the data record 503 from the table 500.

As described above, the server 601 is further configured to receive one or more of following alerts from one of the group of apparatuses 100, the battery level alert, the vibration alert, the moisture alert, the temperature alert; and send an electronic message to a device associated with an operator or a technician for maintenance or service purposes. The server 601 can also receive other information from one of the group of apparatuses 100, for example, the position of the second arm 1062 of the electric actuator 106, the image (for example, the image of the number plate of the vehicle) or video captured by the camera 107, without departing from the scope of the present disclosure.

The server 601 is further configured to receive electricity consumption data from the apparatus 100 indicative of electricity consumption of the apparatus 100 and store the electricity consumption data in association with an apparatus identifier that identifies the apparatus.

FIGS. 8(*a*) to (*c*) illustrate an apparatus for parking a vehicle on a parking spot in accordance with another embodiment of the present disclosure. Although the major features of the apparatus 800 are described below, as can be understood by the person skilled in the art, the features described above with reference to FIG. 1 to FIG. 7 can also be part of the apparatus 800 without departing from the scope of the present disclosure.

Figure 8A:
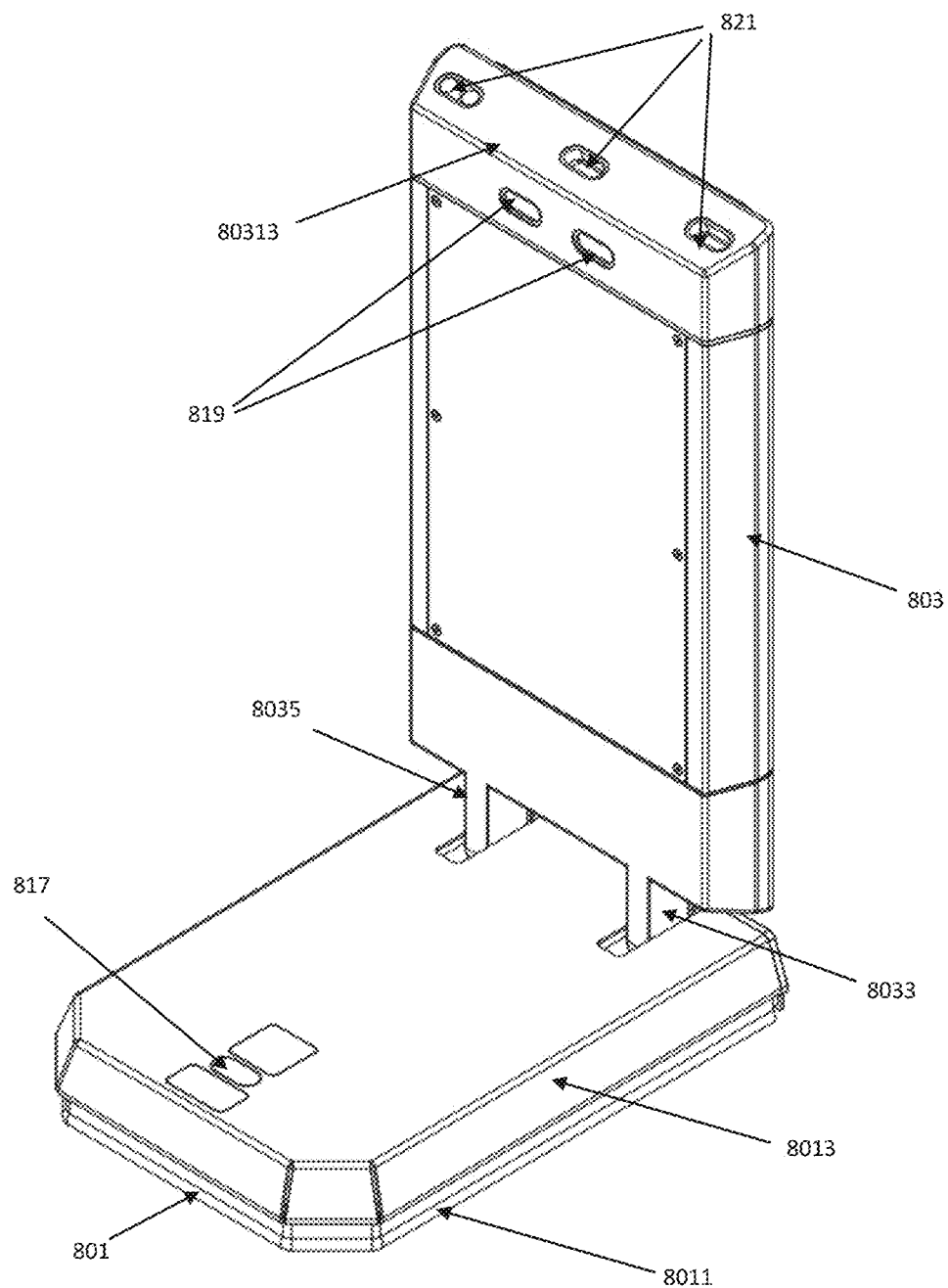
FIGS. 8(a), 8(b) and 8(c) illustrate an apparatus for parking a vehicle on a parking spot in accordance with another embodiment of the present disclosure.
Figure 8B:
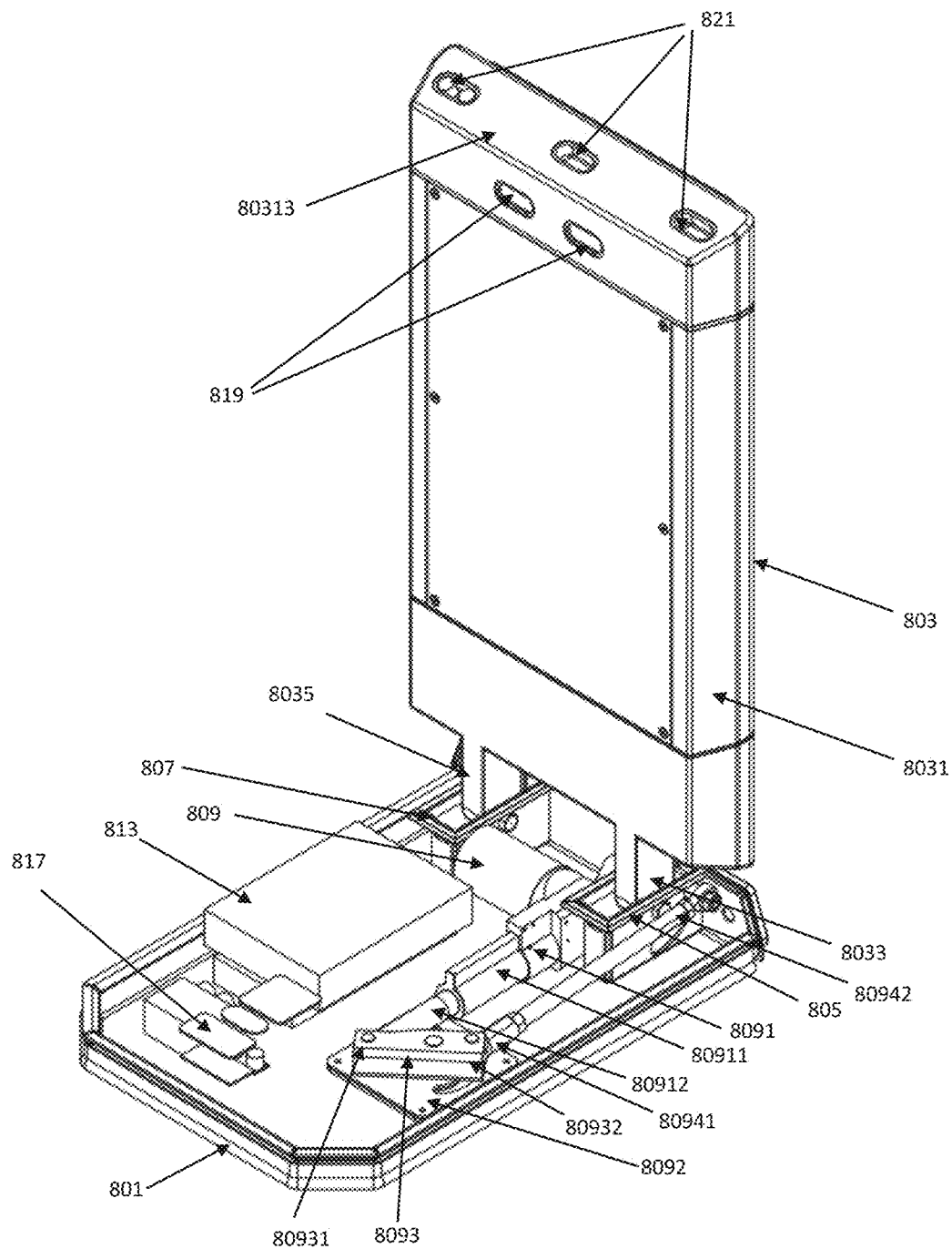
Figure 8C:
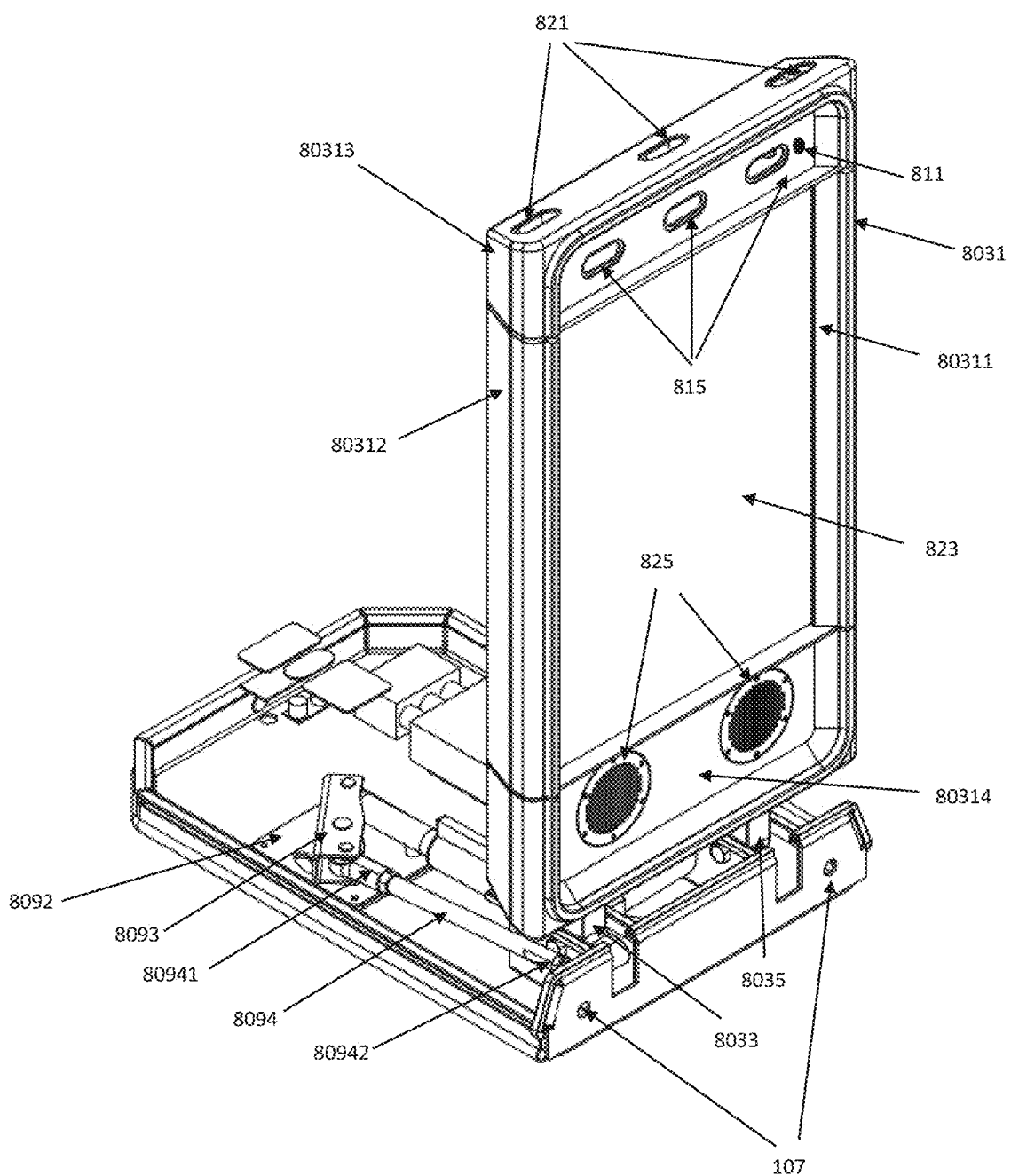

As shown in FIGS. 8(a) to (c), the apparatus 800 comprises a base member 801 and a moveable member 803. For better visibility, the apparatus 800 is shown in FIGS. 8(b) and (c) without the top cover of the base member 801. The movable member 803 includes a support frame 8031, a first support leg 8033 extending from the support frame 8031, and a second support leg 8035 extending from the support frame 8031. The apparatus 800 further comprises a first hinge 805 and a second hinge 807. Both first hinge 805 and the second hinge 807 are secured to the base member 801 and pivotably engaged with the first support leg 8033 and the second support leg 8035, respectively. This way, the movable member 803 can rotate relative to the base member 801.

The apparatus 800 further comprises a driving mechanism 809. The driving mechanism 809 includes an electric actuator 8091 including a first arm 80911 and a second arm 80912, wherein the first arm 80911 of the electronic actuator 809 is pivotably attached to the base member 801 and the second arm 80912 is retractably connected to the first arm 80911. Specifically, the second arm 80912 can extend out of the first arm 80911 and retract into the first arm 80911. The driving mechanism 809 further comprises a support plate 8092 secured to the base member 801, and a rotation lever 8093. The rotation lever 8093 is generally has an actuator end 80931 and a push rod end 80932. The rotation lever 8093 is pivotably connected to the support plate 8092 between the actuator end 80931 and the push rod end 80932 via for example, a pin. The rotation lever 8093 is also pivotably connected to the second arm 80912 of the electric actuator 8091 at the actuator end 80931. The driving mechanism 809 further includes a push rod 8094. The push rod 8094 is pivotably connected to the push rod end 80932 of the rotation lever 8093 at a first end of the push rod 8094 and also pivotably connected to the first support leg 8033 at a second end of the push rod 8094.

The apparatus 800 further includes an information reader 811 configured to read user information from a user device used by the user or driver. The information reader can be for example, an NFC (Near Field Communication) reader or a Radio Frequency Identification (RFID) reader or a Bluetooth reader or a UWB reader. The user device can be an NFC/RFID, Bluetooth or UWB tag that stores user information. The user device can also be another device that incorporates an NFC/RFID or Bluetooth or UWB tag. For example, the user device can be the smart phone of the user (or driver) that supports NFC/RFID, Bluetooth, or UWB functionalities without departing from the scope of the present disclosure. The user device can also be an external card or a chip that supports NFC/RFID, Bluetooth, or UWB functionalities without departing from the scope of the present disclosure.

The apparatus 800 further includes a control unit 813 communicatively connected to the electric actuator 8091 of the driving mechanism 809, the information reader 811, and the server 601 that stores usage information in relation to usage of the parking spot. The control unit 813 is configured to receive the user information from the information reader 811 and receive the usage information from the server 601.

Figure 9:
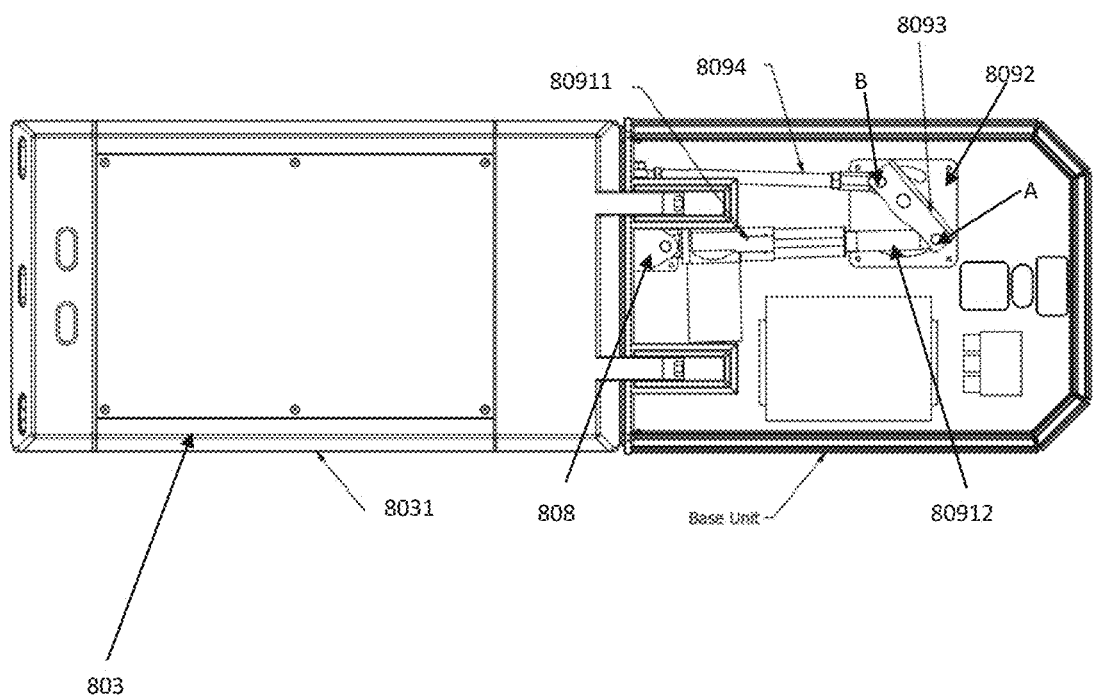
FIG. 9 illustrates the apparatus in accordance with the embodiment of the present disclosure where the moveable member is in a first position.

If the control unit 813 determines that the user information matches the usage information, the control unit 813 sends a first instruction to the electric actuator 8091 of the driving mechanism 809 to cause the second arm 80912 of the electric actuator 8091 to rotate the rotation lever 8093. For example, the second arm 80912 retracts into the first arm 80911. The rotation lever 8093 generates a force to the push rod 8094 to move the first support leg 8033 in order to drive the movable member 803 to a first position where the movable member 803 allows the vehicle to park on the parking spot. FIG. 9 illustrates the apparatus 800 in accordance with the embodiment of the present disclosure where the moveable member 803 is in the first position.

The user information includes a user device identification identifying the user device used by the user, which can be read by the information reader 811 from the user device, referred to as a first user device identification. For example, the first user device identification can be a Universally Unique Identifier (UUID) of a Bluetooth enabled device to identify the user device that supports Bluetooth functionalities, or NFC/RFID/UWB chip UID of an NFC/RFID/UWB tag to identify the user device that support NFC/RFID functionalities. The UUID or UID of the user device can be read from the user device by the corresponding Bluetooth or NFC/RFID/UWB reader.

As an example, a mobile application operates on a mobile phone used by the user presents a touchable button on its screen, for example a button labeled "open", which the user can press when the user is in front of the apparatus 800 to send an open instruction to the server 601 via the communication network 602, indicating the user needs to use the parking spot. Upon receipt of the open instruction at the server 601, the server 601 sends the open instruction to the apparatus 800 via the communication network 602 and the corresponding gateway, for example, gateway 603 or 605, as shown in FIG. 6. The open instruction enables the information reader 811 of the apparatus 800 to read the user information including the user device identification from the mobile phone of the user.

The user device identification is also sent by the user device to the server 601 when the user books the parking spot using the user device via the web portal 700 shown in FIG. 7, for example, the mobile application operating on the mobile phone of the user. The user device identification is stored at the server 601 as part of the usage information, referred to as a second user device identification. The control unit 813 receives the usage information from the server 601 and determines if the first user device identification matches the second user device identification. If the first user device identification matches the second user device identification, that means the user device that was used by the user to book the parking spot is now used by the user to park the vehicle on the parking spot.

In another example, a booking identification is generated by the web portal 700 or the mobile application each time the user books the parking spot using the user device, representing reservation of the parking spot for the user. The booking identification is stored on the user device as part of the user information, which is referred to as a first booking identification. The booking identification is also sent to the server 601 as part of the usage information, referred to as a second booking identification. The control unit 813 is further configured to determine if the first booking identification matches the second booking identification. If the first booking identification matches the second booking identification, that means the parking spot is now available for use by the user who presents the booking identification. As an example, the booking identification may include the name of the user, the location of the apparatus 800 booked by the user, the time period booked by the user, etc.

Figure 10:
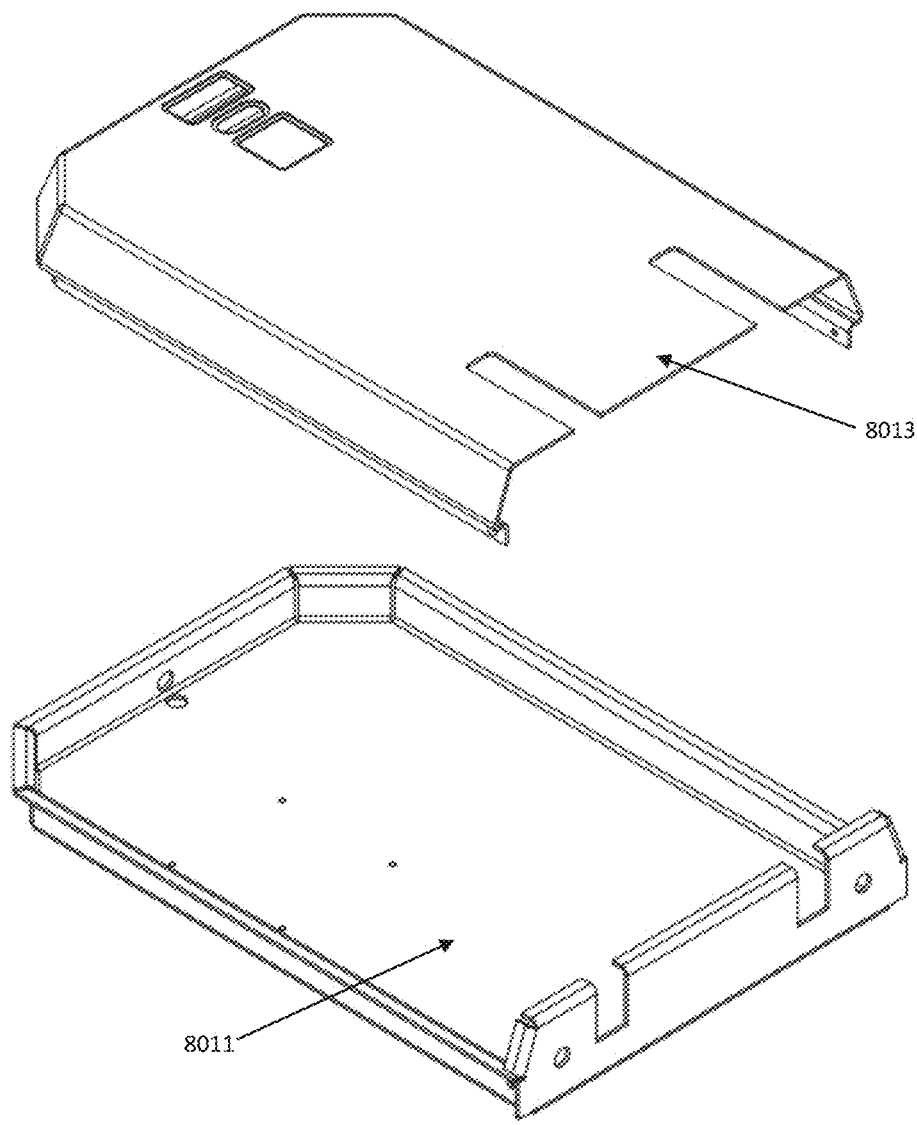
FIG. 10 illustrates an example of a base member of the apparatus in accordance with the embodiment of the present disclosure.

FIG. 10 illustrates an example of the base member 801 of the apparatus 800 in accordance with an embodiment of the present disclosure.

The base member 801 includes a bottom cover 8011 and a top cover 8013. The bottom cover 8011 contacts the ground during normal use of the apparatus 800. The bottom cover 8011 is configured to engage with the top cover 8013 to form an internal space to accommodate at least some of the parts of the apparatus 800. As shown in FIG. 8(*b*), The first hinge 805 and the second hinge 807 are secured to the bottom cover 8011. The first arm 80911 of the electronic actuator 8091 is pivotably attached to the bottom cover via a third hinge 808, as show in FIG. 9. Further, the support plate 8092 is secured to the bottom cover 8011.

Figure 11:
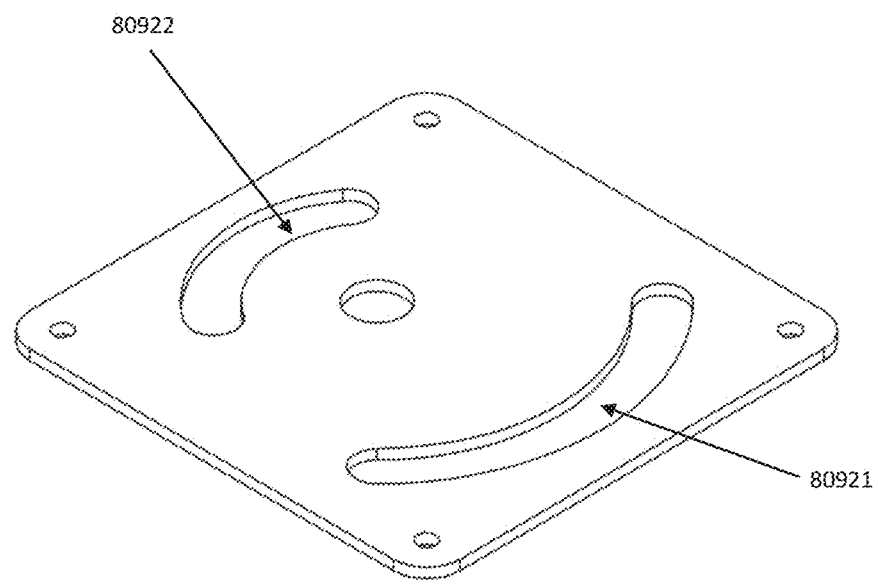
FIG. 11 illustrates an example of a support plate of the apparatus in accordance with an embodiment of the present disclosure.

FIG. 11 illustrates an example of the support plate 8092 of the apparatus 800 in accordance with an embodiment of the present disclosure.

The support plate 8092 includes an actuator channel 80921 and a push rod channel 80922. The rotation lever 8093 is pivotably connected to the second arm 80912 of the electric actuator 8091 via a first pin A and pivotably connected to the push rod 8094 via a second pin B, as shown in FIG. 9. The first pin A is configured to fit in the actuator channel 80921 and the second pin B is configured to fit in the push rod channel 80922. The actuator channel 80921 is shaped into a first curved channel and configured to guide horizontal movement of the second arm 80912, the push rod channel 80922 is shaped into a second curved channel corresponding to the first curved channel and configured to guide horizontal movement of the push rod 8094.

Figure 12A:
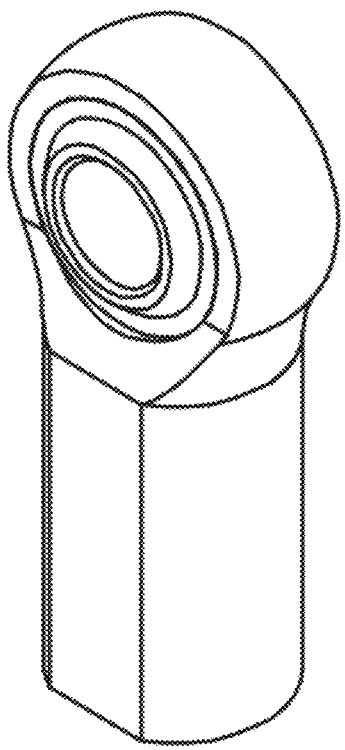
FIGS. 12(a) and 12(b) illustrate examples of a first connector and a second connector of a push rod of the apparatus in accordance with an embodiment of the present disclosure.
Figure 12B:
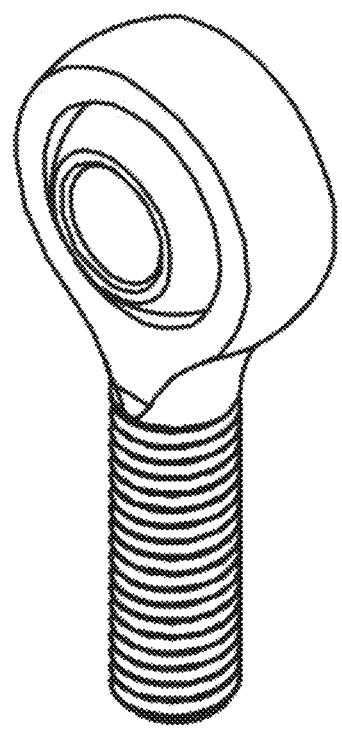

The first end of the push rod 8094 includes a first connector 80941 pivotably connected to the push rod end 80932 of the rotation lever 8093. The first connector 80941 is configured to allow the first end of the push rod 8094 to horizontally move with the push rod end 80932 of the rotation lever 8093. The second end of the push rod 8094 includes a second connector 80942 pivotably connected to the first support leg 8033 of the movable member 803. The second connector 80942 is configured to allow the second end of the push rod 8094 to vertically move the first support leg 8033 of the movable member 803. FIGS. 12(*a*) and 12(*b*) illustrate examples of the first connector 80941 and the second connector 80942 of the push rod 8094 in accordance with an embodiment of the present disclosure.

The apparatus 800 further includes a set of vehicle sensors 815 communicatively connected to the control unit 813, as shown in FIG. 8(*c*). The set of vehicle sensors 815 are configured to detect a distance to the vehicle and a direction of the vehicle approaching the parking spot. The control unit 813 is further configured to determine if the vehicle intends to park on the parking spot based on the distance to the vehicle and the direction of the vehicle. If it is determined that the vehicle intends to park on the parking spot, then the control unit 813 receives the user information from the information reader, receives the usage information from the server 601, and determines if the user information matches the usage information. If it is determined that the user information matches the usage information, the control unit 813 sends the first instruction to the electric actuator 8091 of the driving mechanism 809 to cause the second arm 80912 of the electric actuator 8091 to rotate the rotation lever 8093, for example, retract into the first arm 80911, generating the force to the push rod 8094 to move first support leg 8033 in order to drive the movable member 803 to the first position where the movable member 803 allows the vehicle to park on the parking spot. This is particularly beneficial if the apparatus 800 is powered by a battery because the unnecessary moving the moveable member 803 caused by a vehicle passing by the apparatus 800 can be avoided and the electricity of the battery can be saved.

As shown in FIG. 8(*c*), the support frame 8031 further comprises a first side bar 80311, a second side bar 80312, a top panel 80313 and a bottom panel 80314. The first side bar 80311 and the second side bar 80312 are attached to the top panel 80313 and the bottom panel 80314. The first support leg 8033 and the second support leg 8035 extend from the bottom panel 80314, and are pivotably engaged with the first hinge 805 and the second hinge 807, respectively.

The support frame 8031 is substantially coplanar with the base member 801 when the moveable member 803 is in the first position, as shown in FIG. 9. The support frame 8031 is substantially vertical to the base member 801 when the moveable member 803 is in the second position, as shown in FIGS. 8(*a*) to (*c*).

The apparatus 800 can further include a first car-above sensor 817 communicatively connected to the control unit 813. The first car-above sensor 817 is positioned on the base member 801, for example, the top cover 8013 of the base member 801, and configured to detect presence of the vehicle over the base member 801. The apparatus 800 can further include a second car-above sensor 819 communicatively connected to the control unit 813. The second car-above sensor 819 is positioned on the top panel 80313 of the support frame 8031 and configured to detect presence of the vehicle over the moveable member 803.

The control unit 813 is further configured to receive a first car-above indication from the first car-above sensor 817 indicating that the vehicle is not above the base member 801, and a second car-above indication from the second car-above sensor 819 indicating that the vehicle is not above the moveable member 803. The control unit 813 then sends a second instruction to the driving mechanism 809, particularly, the electric actuator 8091, to drive the movable member 803 to the second position where the movable member 803 does not allow the vehicle to park on the parking spot, as shown in FIGS. 8(*a*) to (*c*).

The apparatus 800 can further comprise a set of collision sensors 821 communicatively connected to the control unit 813. The set of collision sensors 821 are positioned on the top panel 80313 of the support frame 8031 and configured to detect a potential collision between the moveable member 803 and an object, for example, an electric tool accidentally left on the ground, the vehicle, etc., during movement of the moveable member 803. If there is a potential collision, the set of collision sensors 821 send a collision signal to the control unit 813. The control unit 813 is configured to stop movement of the moveable member 803 in order to avoid a collision between the moveable member 803 and the object.

Figure 13:
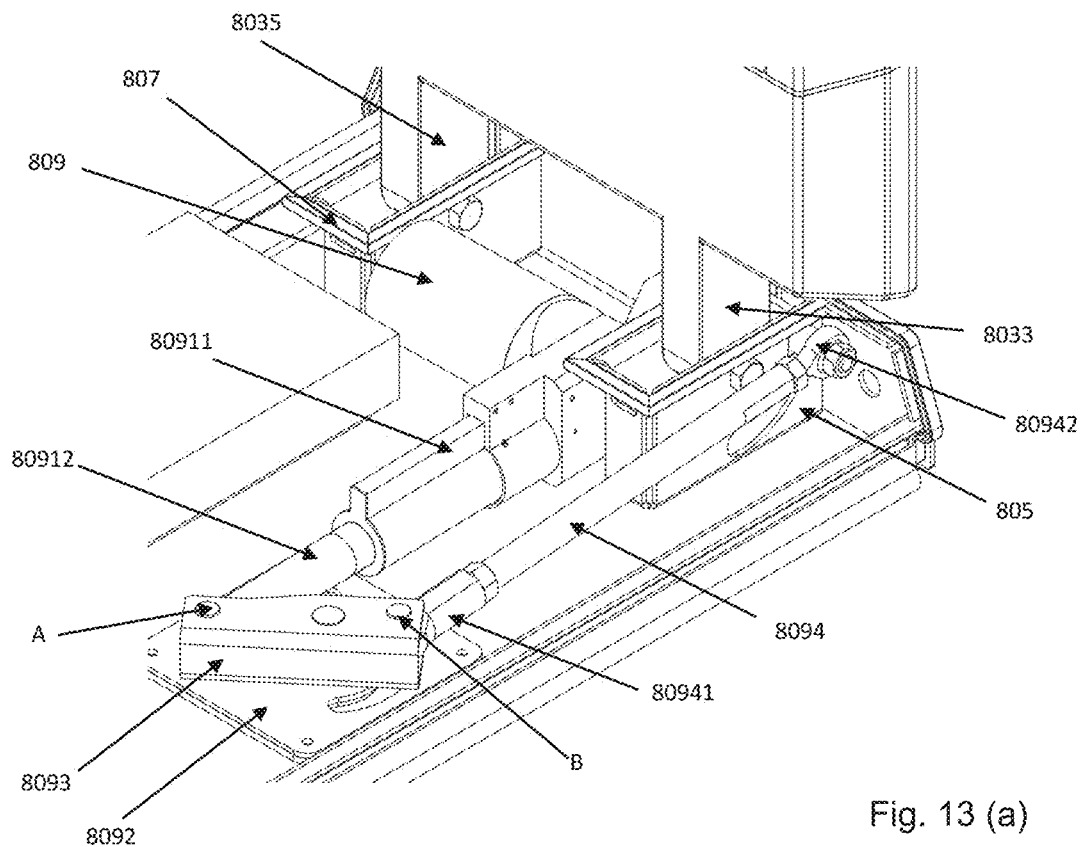
FIGS. 13(a) and 13(b) are partial views of the apparatus in accordance with an embodiment of the present disclosure.
Figure 13:
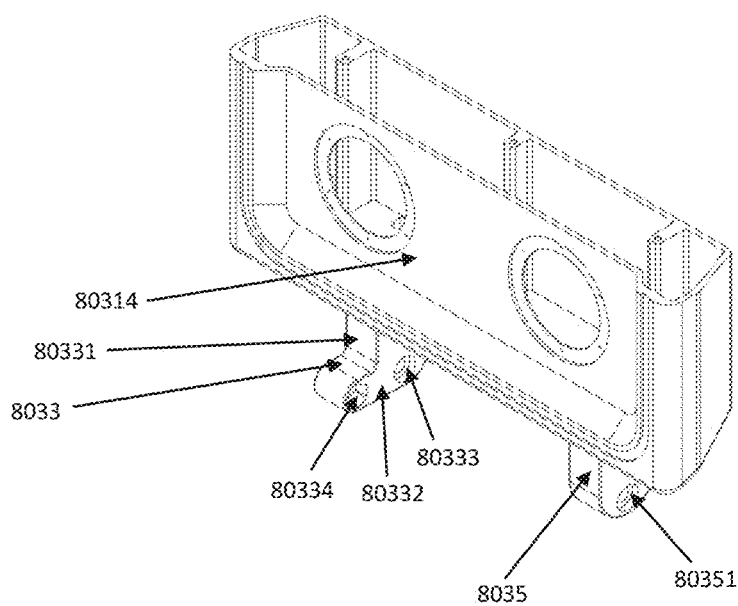
Figure 14A:
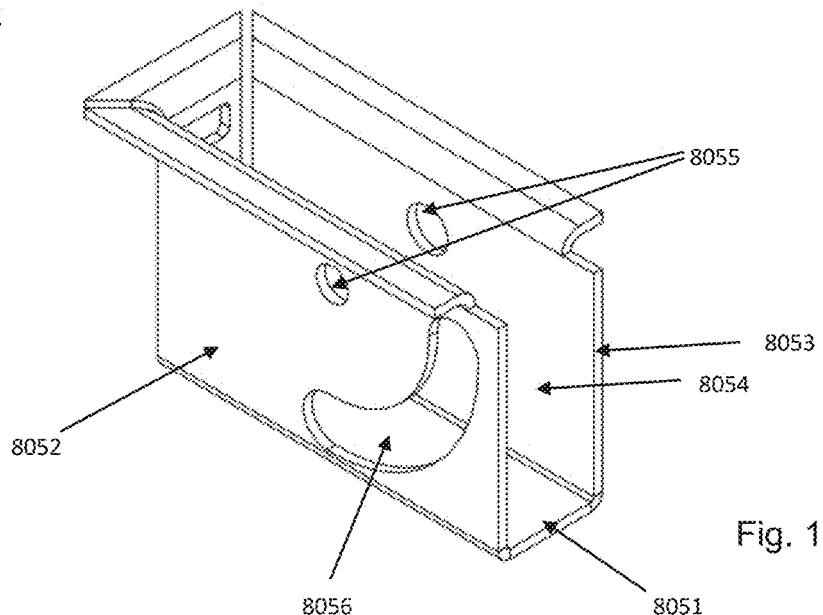
FIGS. 14(a) and 14(b) illustrate a first hinge and a second hinge of the apparatus in accordance with an embodiment of the present disclosure.
Figure 14B:
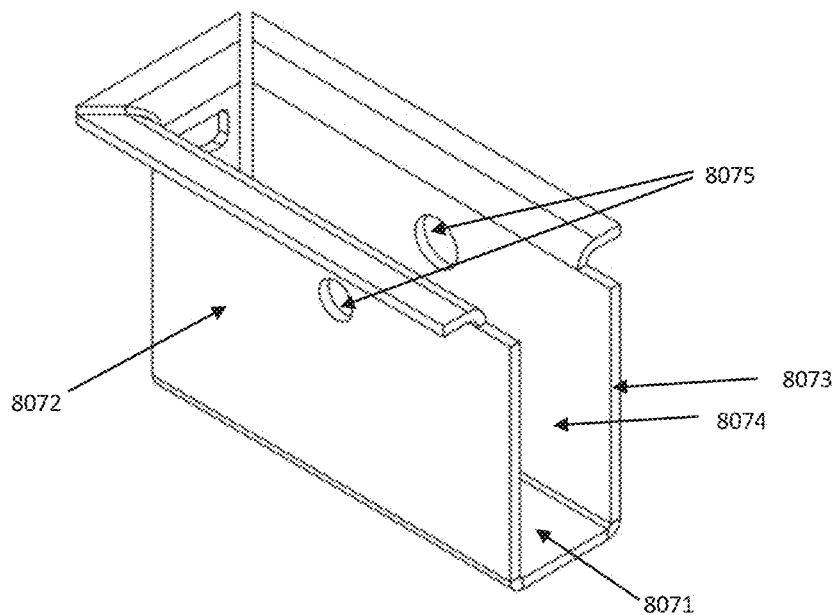

FIGS. 13(*a*) and 13(*b*) are partial views of the apparatus 800 for better visibility in accordance with an embodiment of the present disclosure. FIGS. 14(*a*) and 14(*b*) illustrate examples of the first hinge 805 and the second hinge 807 of the apparatus 800 in accordance with an embodiment of the present disclosure.

As shown in FIG. 13(*b*), the first support leg 8033 is generally a L-shaped member with a first part 80331 extending from the bottom panel 80314, and a second part 80332 extending from the first part 80331. The first support leg 8033 incudes a first connection hole 80333 and a second connection hole 80334. The second support leg 8035 extends from the bottom panel 80314 and includes a third connection hole 80351.

As shown in FIGS. 14(*a*) and 14(*b*), the first hinge 805 include an installation bottom 8051, a first side 8052 and a second side 8053 extending from the installation bottom 8051. The first hinge 805 can be secured to the bottom cover 8011 of the base member 801 by different ways, for example, bolts and nuts or welding. The first side 8052 and the second side 8053 form a hinge channel 8054 therebetween to accommodate the first support leg 8033. Each of the first side 8052 and the second side 8053 includes a hinge hole 8055 to allow a screw or pin to extend through. The first side 8052 further includes a guide channel 8056. The guide channel 8056 extends through the first side 8052 and is generally shaped into a curved channel. The guide channel 8056 is configured to guide the vertical movement of the second end of the push rod 8094, particularly, the second connector 80942 of the push rod 8094.

The second hinge 807 include an installation bottom 8071, a first side 8072 and a second side 8073 extending from the installation bottom 8071. The second hinge 807 can be secured to the bottom cover 8011 of the base member 801 by different ways, for example, bolts and nuts or welding. The first side 8072 and the second side 8073 form a hinge channel 8074 therebetween to accommodate the second support leg 8035. Each of the first side 8072 and the second side 8073 includes a hinge hole 8075 to allow a screw or pin to extend through.

As shown in FIG. 13(*a*), the first support leg 8033 is pivotably connected to the first hinge 805 via a bolt or screw extending through the first connection hole 80333 of the first support leg 8033 and the hinge holes 8055 of the first hinge 805. The second connector 80942 of the push rod 8094 is pivotably connected to the first support leg 8033 via another bolt or screw extending through the second connection hole 80334 of the first support leg 8033 and the guide channel 8056 of the first hinge 805. The second support leg 8035 is pivotably connected to the second hinge 807 via a further screw extending through the third connection hole 80351 of the second support leg 8035 and the hinge holes 8075 of the second hinge 807.

As describe above, if the control unit 813 determines that the user information matches the usage information, the control unit 813 sends the first instruction to the electric actuator 8091 of the driving mechanism 809 to cause the second arm 80912 of the electric actuator 8091 to rotate the rotation lever 8093. For example, the second arm 80912 retracts into the first arm 80911. When the rotation lever 8093 rotates, it generates the force to the push rod 8094 to move first support leg 8033 and the second support leg 8035. Specifically, the force moves the second connector 80942 along the guide channel 8056 of the first hinge 805, which in turn pivotally moves the first support leg 8033 relative to the first hinge 805 and pivotally moves the second support leg 8035 relative to the second hinge 8057. In this example, the second connector 80942 is driven by the rotation lever 8093 from the top of the guide channel 8056 to the bottom of the guide channel 8056. As a result, the movable member 803 is driven to the first position where the movable member 803 allows the vehicle to park on the parking spot, as shown in FIG. 9.

On the other hand, when the control unit 813 receives the first car-above indication from the first car-above sensor 817 indicating that the vehicle is not above the base member 801, and the second car-above indication from the second car-above sensor 819 indicating that the vehicle is not above the moveable member 803, the control unit 813 then sends the second instruction to the driving mechanism 809, particularly, the electric actuator 8091, to cause the second arm 80912 of the electric actuator 8091 to rotate the rotation lever 8093. For example, the second arm 80912 extends out of the first arm 80911. When the rotation lever 8093 rotates, it generates the force to the push rod 8094 to move first support leg 8033 and the second support leg 8035. Specifi-cally, the force moves the second connector 80942 along the guide channel 8056 of the first hinge 805, which in turn pivotally moves the first support leg 8033 relative to the first hinge 805 and pivotally moves the second support leg 8035 relative to the second hinge 8057. In this example, the second connector 80942 is driven by the rotation lever 8093 from the bottom of the guide channel 8056 to the top of the guide channel 8056. As a result, the movable member 803 is driven to the second position where the movable member 803 does not allow the vehicle to park on the parking spot, as shown in FIGS. 8(*a*) to 8(*c*).

The apparatus 800 can further comprise one or more cameras 107 attached to the base member 801. The camera 107 is configured to capture an image of the vehicle that is approaching the parking spot and send the image of the vehicle to the control unit 813. The image of the vehicle may include an image of an identification number of the vehicle, for example, the number plate of the vehicle. The control unit 813 is configured to recognise the identification number, for example, the plate number of the vehicle.

The apparatus 800 can further comprise a display 823 attached to the movable member 803 and communicatively connected to the control unit 813. For example, the display 823 is embedded between the first side bar 80311, the second side bar 80312, the top panel 80313 and the bottom panel 80314. The control unit 813 is further configured to present the identification number or the plate number of the vehicle on the display 823.

The apparatus 800 can further comprise a set of speakers 825 attached to the movable member 803, for example, the bottom panel 80314 of the moveable member 803. The set of speakers 825 are communicatively connected to the control unit 813. The control unit 813 is further configured to cause the speaker to generate an audible sound signal.

As an example, if the first booking identification received from the user device does not match the second booking identification received from the server 601, the control unit 813 is further configured to construct a prompt message based on the first booking identification and present the prompt message via the display 823 or the speaker 825. For example, the control unit 813 may display a prompt message on the display 823, "Michael Smith, the bollard you booked is on level 2, you are on level 1 now". The prompt message includes the name of the user, and the right location of the apparatus 800 booked by the user. In this prompt message, the name "Michael Smith" and the location "level 2" are extracted from the first booking identification received the user device. The prompt message can also be played via the speaker 825 as a voice message.

Figure 15:
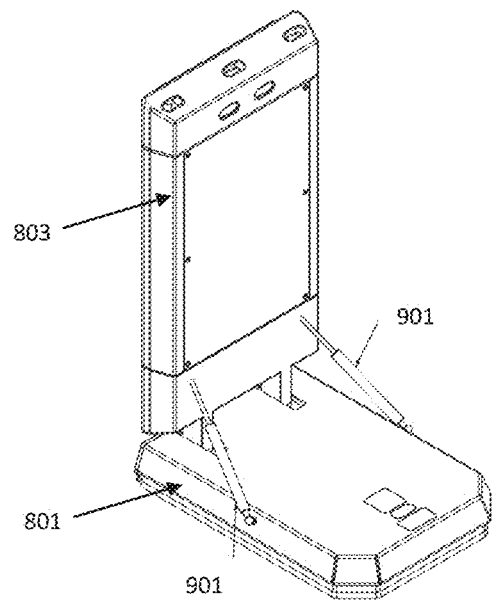
FIG. 15 illustrates an apparatus for parking a vehicle on a parking spot in accordance with another embodiment of the present disclosure.

FIG. 15 illustrates an apparatus 900 for parking a vehicle on a parking spot in accordance with another embodiment of the present disclosure. The apparatus 900 is similar to the apparatus 800 in terms of structure, but the apparatus 900 further includes a set of gas struts 901 provided between the base member 801 and the moveable member 803. The set of gas struts 901 are configured to dampen the impact of the vehicle on the moveable member 803 if that happens.

Figure 16:
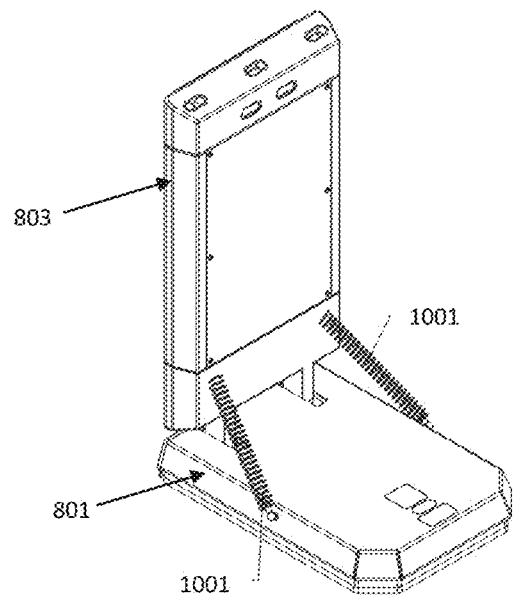
FIG. 16 illustrates an apparatus for parking a vehicle on a parking spot in accordance with another embodiment of the present disclosure.

FIG. 16 illustrates an apparatus 1000 for parking a vehicle on a parking spot in accordance with another embodiment of the present disclosure. The apparatus 1000 is similar to the apparatus 800 in terms of structure, but the apparatus 1000 further includes a set of spring members 1001 provided between the base member 801 and the moveable member 803. The set of spring members 1001 are configured to dampen the impact of the vehicle on the moveable member 803 if that happens.

Figure 17:
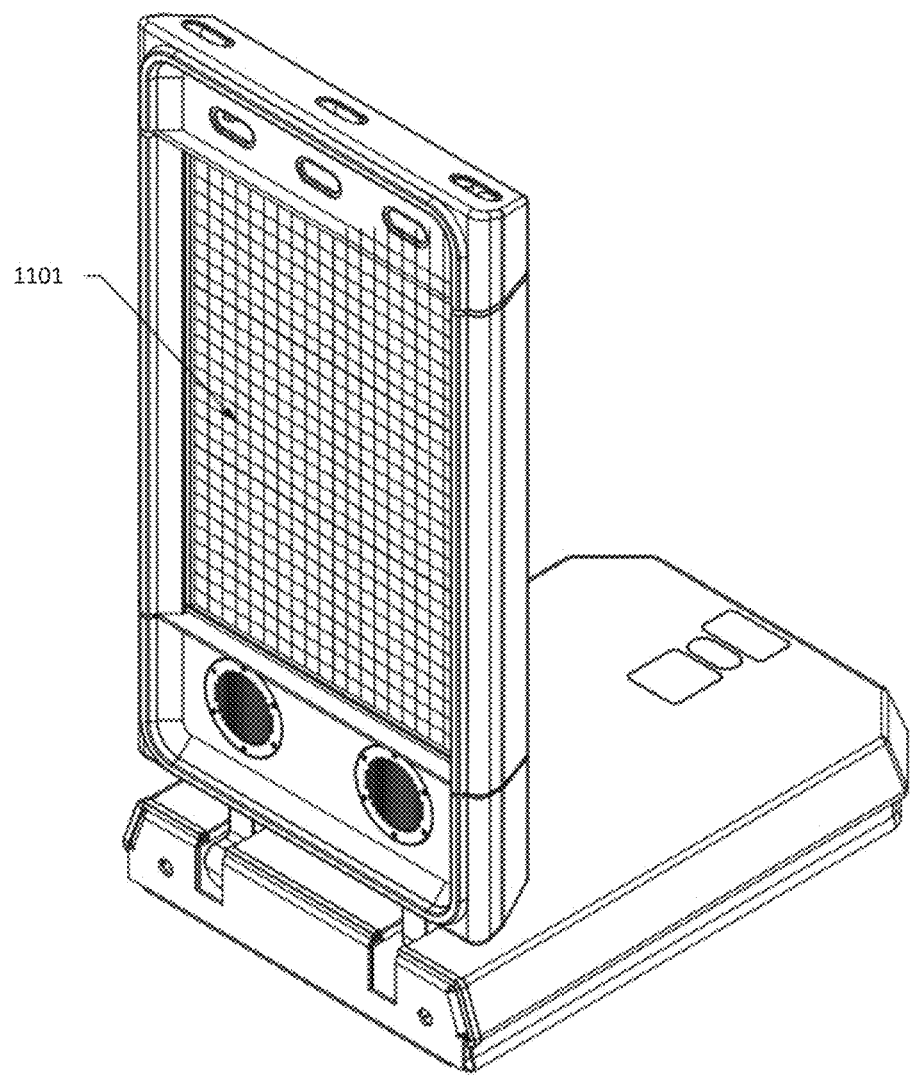
FIG. 17 illustrates an apparatus for parking a vehicle on a parking spot in accordance with another embodiment of the present disclosure.

FIG. 17 illustrates an apparatus 1100 for parking a vehicle on a parking spot in accordance with another embodiment of the present disclosure. The apparatus 1100 is generally similar to the apparatus 800 in terms of structure, but the apparatus 1100 includes a solar panel 1101. The solar panel 1101 is embedded between the first side bar 80311, the second side bar 80312, the top panel 80313 and the bottom panel 80314. The solar panel 1101 is configured to provide electricity energy to a battery if the apparatus 1100 is powered by the battery.

The apparatus 800, 900, and 1000 can further comprise one or more other components described with reference to the apparatus 100, for example, the battery, the battery sensor, the first/second communication unit, the vibration sensor, the moisture sensor, the motion sensor, the temperature sensor; the power supply, the electricity measuring device. The control unit 813 can also be configured to perform the functionalities in relation to these components, as described above. The apparatus 800, 900, and 1000 can also be part of the parking management system 600 as described above.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is meant to provide the broadest scope, consistent with the principles and the novel and inventive features disclosed or suggested herein. Accordingly, the disclosure is anticipated to hold on to all other such alternatives, modifications, and variations that fall within the scope of the present disclosure and appended claims.

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

The invention claimed is:

1. An apparatus for parking a vehicle on a parking spot, the apparatus comprising:
    a base member;
    a movable member including a support frame, a first support leg extending from the support frame, and a second support leg extending from the support frame;
    a first hinge and a second hinge secured to the base member and pivotably engaged with the first support leg and the second support leg, respectively, to allow the movable member to rotate relative to the base member;
    a driving mechanism, including
        an electric actuator including a first arm and a second arm, wherein the first arm of the electronic actuator is pivotably attached to the base member and the second arm is retractably connected to the first arm;
        a support plate secured to the base member;
        a rotation lever having an actuator end and a push rod end, the rotation lever being pivotably connected to the support plate between the actuator end and the push rod end, pivotably connected to the second arm of the electric actuator at the actuator end;
        a push rod pivotably connected to the push rod end of the rotation lever at a first end of the push rod and pivotably connected to the first support leg at a second end of the push rod;
    an information reader configured to read user information from a user device; and
    a control unit communicatively connected to the electric actuator of the driving mechanism, the information reader, and a server that stores usage information in relation to usage of the parking spot, the control unit being configured to
        receive the user information from the information reader;
        receive the usage information from the server; and
        if the user information matches the usage information, send a first instruction to the electric actuator of the driving mechanism to cause the second arm of the electric actuator to rotate the rotation lever, generating a force to the push rod to move the first support leg in order to drive the movable member to a first position where the movable member allows the vehicle to park on the parking spot.

2. The apparatus of claim 1, wherein the user information includes a first user device identification identifying the user device used by the user, the usage information includes a second user device identification identifying the user device, the control unit is further configured to determine if the first user device identification matches the second user device identification.

3. The apparatus of claim 2, wherein the user information includes a first booking identification representing reservation of the parking spot, the usage information includes a second booking identification identifying reservation of the parking spot, the control unit is further configured to determine if the first booking identification matches the second booking identification.

4. The apparatus of claim 3, wherein the base member includes a bottom cover and a top cover, the bottom cover being configured to engage with the top cover to form an internal space, wherein the first hinge and the second hinge are secured to the bottom cover, wherein the first arm of the electronic actuator is pivotably attached to the bottom cover via a third hinge, and the support plate is secured to the bottom cover.

5. The apparatus of claim 4, wherein the support plate includes an actuator channel and a push rod channel, the rotation lever is pivotably connected to the second arm of the electric actuator via a first pin and pivotably connected to the push rod via a second pin, the first pin is configured to fit in the actuator channel and the second pin is configured to fit in the push rod channel, the actuator channel is shaped into a first curved channel and configured to guide horizontal movement of the second arm, the push rod channel is shaped into a second curved channel corresponding to the first curved channel and configured to guide horizontal movement of the push rod.

6. The apparatus of claim 4, wherein the first end of the push rod includes a first connector configured to allow the first end of the push rod to horizontally move with the push rod end of the rotation lever, and the second end of the push rod includes a second connector configured to allow the second end of the push rod to vertically move the first support leg of the movable member.

7. The apparatus of claim 4, wherein the information reader includes a Bluetooth reader, a Near Field Communication (NFC) or a Radio Frequency Identification (RFID) reader, or an Ultra Wide Band (UWB) reader.

8. The apparatus of claim 4, further comprising:
a set of vehicle sensors communicatively connected to the control unit, the set of vehicle sensors being configured to detect a distance to the vehicle and a direction of the vehicle approaching the parking spot, and the control unit is further configured to
  determine that the vehicle intends to park on the parking spot based on the distance to the vehicle and the direction of the vehicle;
  receive the user information from the information reader;
  receive the usage information from the server; and
  if the user information matches the usage information, send the first instruction to the electric actuator of the driving mechanism to cause the second arm of the electric actuator to rotate the rotation lever, generating the force to the push rod to move first support leg in order to drive the movable member to the first position where the movable member allows the vehicle to park on the parking spot.

9. The apparatus of claim 8, further comprising:
a camera attached to the base member, the camera being configured to capture an image of the vehicle, and send the image of vehicle to the control unit, the control unit being configured to recognise the identification number of the vehicle;
a display attached to the movable member and communicatively connected to the control unit, the control unit is further configured to present the identification number on the display; and
a speaker attached to the movable member and communicatively connected to the control unit, and the control unit is further configured to cause the speaker to generate an audible sound signal.

10. The apparatus of claim 9, wherein the control unit is further configured to
  if the first booking identification received from the user device does not match the second booking identification received from the server,
  construct a prompt message based on the first booking identification; and present the prompt message via the display or the speaker.

11. The apparatus of claim 9, further comprising:
a battery to provide electrical power;
a battery sensor communicatively connected to the battery and the control unit, the battery sensor being configured to detect a battery level of the battery, and the control unit is further configured to
  receive a battery indication from the battery sensor indicative of the battery level of the battery; and
  send a battery level alert to the server if the battery level of the battery is below a battery level threshold.

12. The apparatus of claim 11, further comprising:
a first communication unit communicatively connected to the control unit, and the control unit is further configured to communicate with the server via the first communication unit; wherein the first communication unit operates under a communication protocol including LoRaWan, WiFi, and Bluetooth.

13. The apparatus of claim 12, further comprising:
a second communication unit communicatively connected to the control unit, the second communication unit being configured to receive media and advertising information from a media and advertising server, and the control unit is further configured to
  receive the media and advertising information from the second communication unit; and
  present the media and advertising information on the display.

14. The apparatus of claim 13, further comprising:
a vibration sensor communicatively connected to the control unit, the vibration sensor being configured to detect a vibration level, and the control unit is further configured to
  receive a vibration indication from the vibration sensor indicative of the vibration level; and
  send a vibration alert to the server and cause the speaker to generate the audible sound signal if the vibration level is above a vibration threshold, or
  enable the camera to take one or more images or video footages with a time stamp in order to produce a visual record if the vibration level is above a vibration threshold.

15. The apparatus of claim 14, further comprising:
a moisture sensor communicatively connected to the control unit, the moisture sensor being configured to detect a moisture level, and the control unit is further configured to
  receive a moisture indication from the moisture sensor indicative of the moisture level; and
  send a moisture alert to the server if the moisture level is above a moisture threshold, or
  enable the camera to take one or more images or video footages with a time stamp in order to produce a visual record if the moisture level is above a moisture threshold.

16. The apparatus of claim 15, further comprising:
a motion sensor communicatively connected to the control unit, the motion sensor being configured to detect a motion event caused by a surrounding object, and the control unit is further configured to
  receive a motion indication from the motion sensor indicative of the motion event; and
  cause the speaker to generate an audible sound alert.

17. The apparatus of claim 16, further comprising:
a temperature sensor communicatively connected to the control unit, the temperature sensor being configured to detect a temperature level, and the control unit is further configured to
  receive a temperature indication from the temperature sensor indicative of the temperature level; and
  send a temperature alert to the server if the temperature level is above a temperature threshold, or
  enable the camera to take one or more images or video footages with a time stamp in order to produce a visual record if the temperature level is above a temperature threshold.

18. The apparatus of claim 17, further comprising:
a power supply that provides electricity from an electricity grid; and
an electricity measuring device communicatively connected to the control unit and the power supply, the electricity measuring device being configured to measure electricity consumption of the power supply,
the control unit is further configured to
  receive electricity consumption data from the electricity measuring device indicative of the electricity consumption of the power supply; and
  send the electricity consumption data to the server.

19. The apparatus of claim 18, wherein the usage information includes a time period in which the parking spot can be used, and the control unit is further configured to
   determine a current time; and
   send the first instruction to the driving mechanism to drive the movable member to the first position if the current time is within the time period.

20. The apparatus of claim 19, wherein the support frame is substantially coplanar with the base member when the support frame is in the first position, the support frame is substantially vertical to the base member when the support frame is in the second position, the support frame further comprises a first side bar, a second side bar, a top panel and a bottom panel, wherein the first side bar and the second side bar are attached to the top panel and the bottom panel, the first support leg and the second support leg extending from the bottom panel, wherein the display is embedded between the first side bar, the second side bar, the top panel and the bottom panel.

21. The apparatus of claim 20, further comprising a solar panel embedded between the side bar, the second side bar, the top panel and the bottom panel.

22. The apparatus of claim 21, further comprising:
   a first car-above sensor communicatively connected to the control unit, the first car-above sensor being positioned on the base member and configured to detect presence of the vehicle over the base member;
   a second car-above sensor communicatively connected to the control unit, the second car-above sensor being positioned on the top panel of the support frame and configured to detect presence of the vehicle over the moveable member,
   the control unit is further configured to
      receive a first car-above indication from the first car-above sensor indicating that the vehicle is not above the base member, and a second car-above indication from the second car-above sensor indicating that the vehicle is not above the moveable member; and
      send a second instruction to the driving mechanism to drive the movable member to a second position where the movable member does not allow the vehicle to park on the parking spot.

23. The apparatus of claim 22, further comprising a set of collision sensors communicatively connected to the control unit, the set of collision sensors positioned on the top panel of the support frame and being configured to detect a potential collision between the moveable member and an object during movement of the moveable member, and send a collision signal to the control unit, and the control unit is configured to stop movement of the moveable member in order to avoid a collision between the moveable member and the object.

24. A parking management system for parking a vehicle on a parking spot, comprising:
   a group of apparatuses according to claim 1;
   a server communicatively connected to each of the apparatuses via a communication network, wherein the server is configured to
      receive usage information in relation to usage of the parking spot from a computing device used by a user, the usage information including an identification number identifying the vehicle;
      receive a request for the usage information from one of the group of apparatuses via the network; and
      send the usage information including the identification number to the apparatus via the communication network.

25. The parking management system of claim 24, wherein the communication network operates under a communication protocol including LoRaWan and WiFi.

26. The parking management system of claim 25, wherein the server is further configured to
   receive one or more of following alerts from one of the group of apparatuses,
      a battery level alert,
      a vibration alert,
      a moisture alert,
      a temperature alert; and
   send an electronic message to a device associated with an operator for service purposes.

27. The parking management system of claim 26, wherein the server is further configured to
   receive electricity consumption data from the apparatus indicative of electricity consumption of the apparatus; and
   store the electricity consumption data in association with an apparatus identifier that identifies the apparatus.

28. The parking management system of claim 25, further comprising:
   a positioning device associated with the vehicle, the positioning device comprising an inertial navigation system to determine a position of the vehicle, the positioning device being configured to send the position of the vehicle to the server via a communication network operating under a communication protocol including LoRaWan.

29. An apparatus for parking a vehicle on a parking spot, comprising:
   a base member;
   a movable member movably attached to the base member;
   a driving mechanism attached to the base member and the movable member, the driving mechanism being configured to drive the movable member;
   a camera attached to the base member, the camera being configured to capture an image of the vehicle; and
   a control unit communicatively connected to the driving mechanism, the camera, and a server that stores usage information in relation to usage of the parking spot, the control unit being configured to
      receive the image of the vehicle from the camera;
      determine a first identification number of the vehicle from the image of the vehicle;
      receive the usage information from the server, the usage information including a second identification number; and
      if the first identification number matches the second identification number, send a first instruction to the driving mechanism to drive the movable member to a first position where the movable member allows the vehicle to park on the parking spot.

* * * * *